United States Patent [19]

Muramatsu et al.

[11] Patent Number: 5,585,062
[45] Date of Patent: Dec. 17, 1996

[54] PROCESS FOR MAKING A CYLINDRICAL PRODUCT OF FIBER REINFORCEMENT-THERMOPLASTIC RESIN COMPOSITE

[75] Inventors: Teruaki Muramatsu, Tokushima; Yoshihiro Endo, Shizuoka, both of Japan

[73] Assignee: Toho Rayon Co., Ltd., Tokyo, Japan

[21] Appl. No.: 366,323

[22] Filed: Dec. 29, 1994

[30] Foreign Application Priority Data

Dec. 29, 1993 [JP] Japan .................................. 5-351436
Sep. 8, 1994 [JP] Japan .................................. 6-242349

[51] Int. Cl.⁶ .................................................. B29C 33/38
[52] U.S. Cl. .................. 264/314; 264/316; 264/322; 264/334; 264/345; 264/348
[58] Field of Search .................................. 264/314, 316, 264/322, 345, 348

[56] References Cited

U.S. PATENT DOCUMENTS

| | | | |
|---|---|---|---|
| 3,742,106 | 6/1973 | Price | 264/131 |
| 4,759,815 | 7/1988 | Frey | 264/316 X |
| 4,897,286 | 1/1990 | Kosuda et al. | 427/594 |
| 5,262,118 | 11/1993 | Fukushima et al. | 264/512 |
| 5,384,085 | 1/1995 | Houser et al. | 264/316 X |

FOREIGN PATENT DOCUMENTS

| | | |
|---|---|---|
| 415207 | 3/1991 | European Pat. Off. . |
| 60-28543 | 2/1985 | Japan . |
| 1-92232 | 4/1989 | Japan . |
| 2-14039 | 1/1990 | Japan . |
| 5-69492 | 3/1993 | Japan . |
| WO90/09272 | 8/1990 | WIPO . |

*Primary Examiner*—Leo B. Tentoni
*Attorney, Agent, or Firm*—Sughrue, Mion, Zinn, Macpeak & Seas

[57] ABSTRACT

A process for producing a cylindrical product of a fiber reinforcement-thermoplastic resin composite, which involves disposing a mandrel on a flexible guide sheet which can be formed in the shape of the letter U around the mandrel, heating a fiber reinforcement-thermoplastic resin composite sheet to a temperature not lower than the distortion temperature of the resin and lower than the thermal degradation temperature of the resin of the composite, disposing an end of the heated composite sheet at a line of contact of the mandrel with the flexible guide sheet, then rolling the mandrel on the guide sheet while moving the guide sheet, the guide sheet forming a shape of the letter U around the mandrel being drawn into the concave portion of the letter U, and the composite sheet disposed between the mandrel and the guide sheet being in intimate contact with the mandrel and the guide sheet, to thereby wind the composite sheet on the mandrel, and then recovering a cylindrical product made from the wound composite sheet. An apparatus for carring out production of the cylindrical product using a mandrel and a guide sheet.

20 Claims, 13 Drawing Sheets

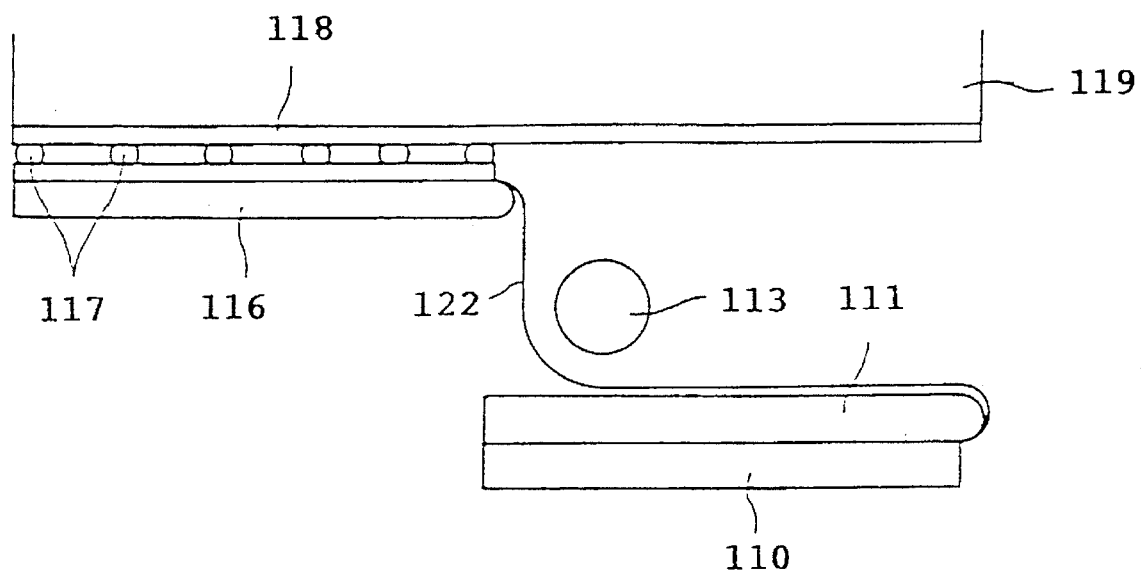
Fig. 1-a

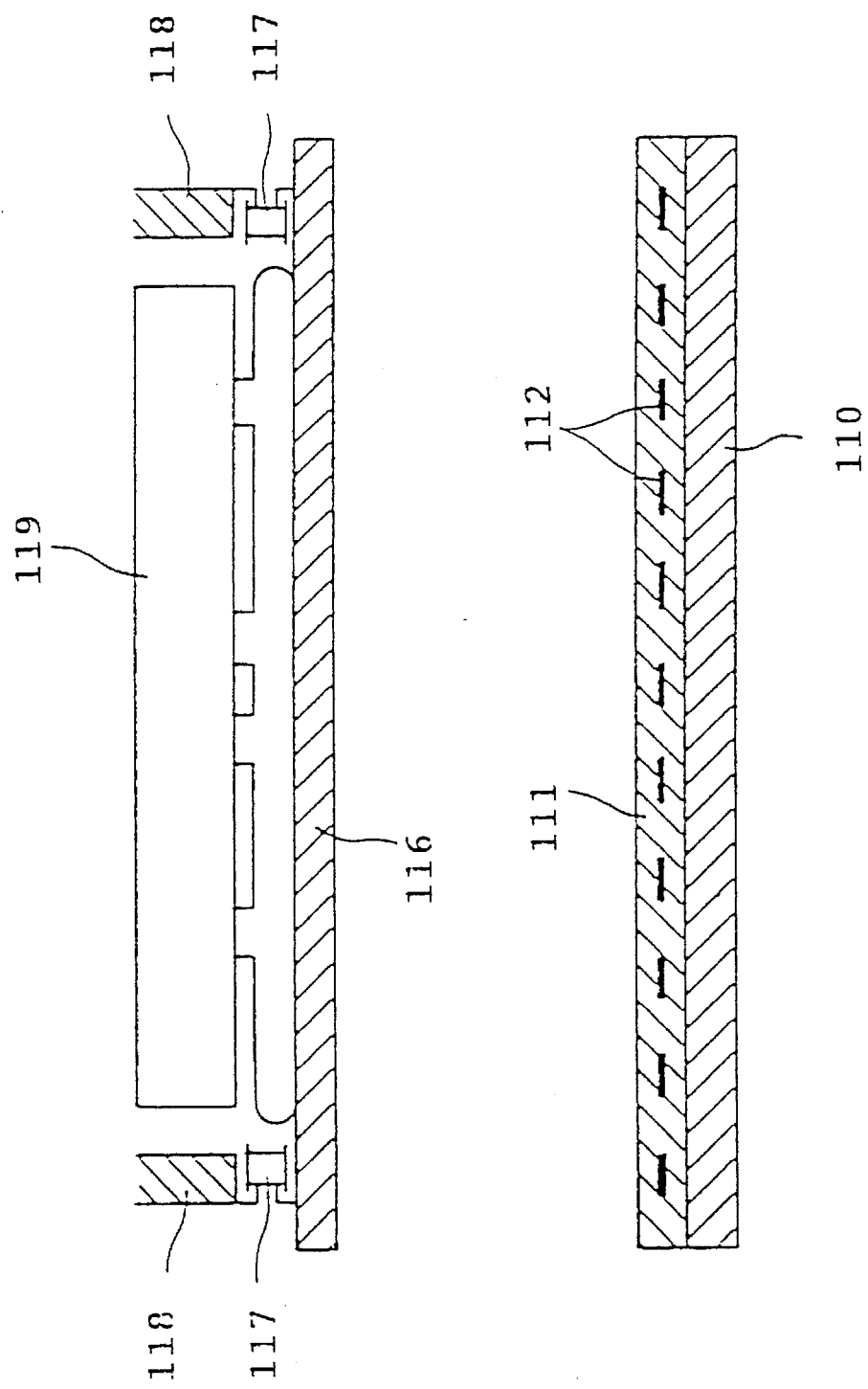

Fig. 1-c
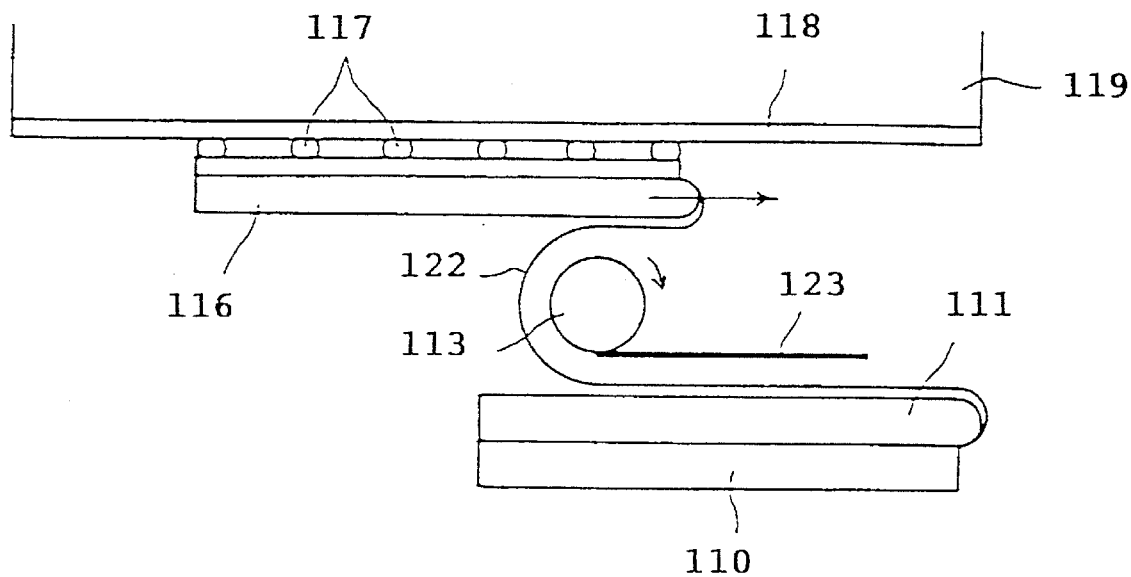
Fig. 1-d
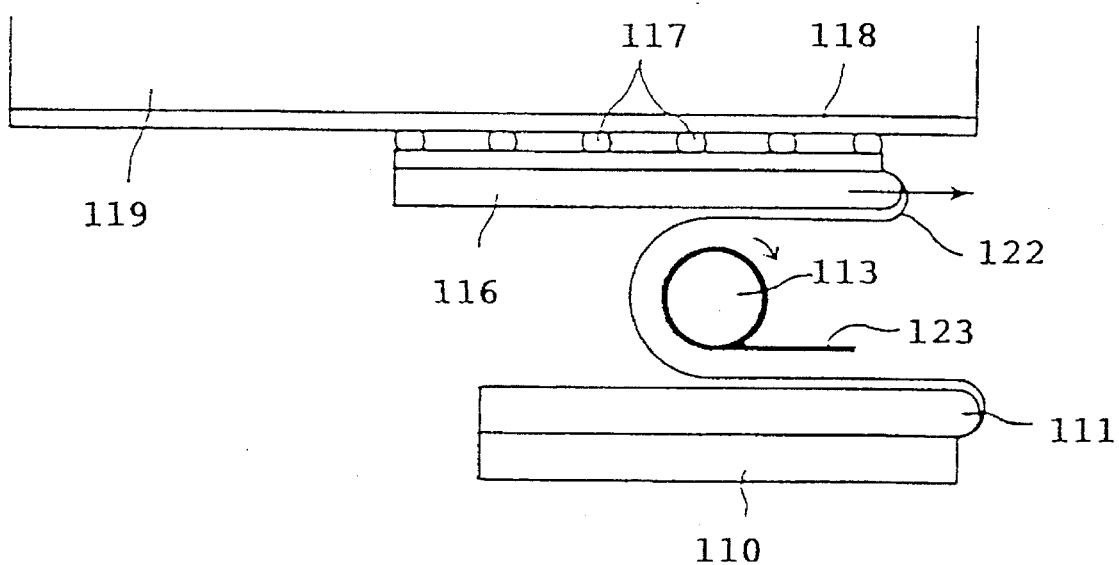

Fig. 4-a
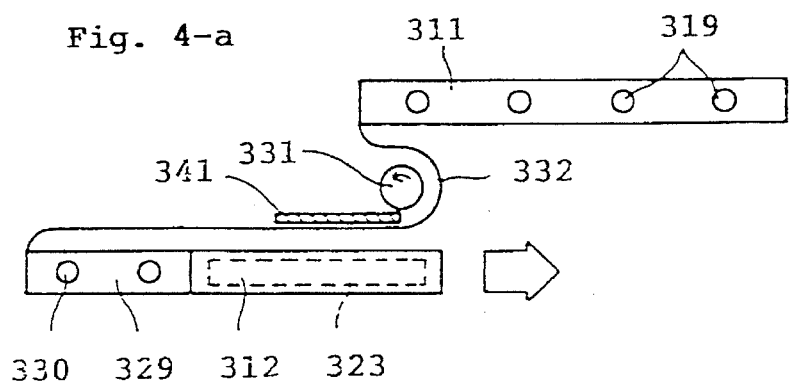
Fig. 4-b
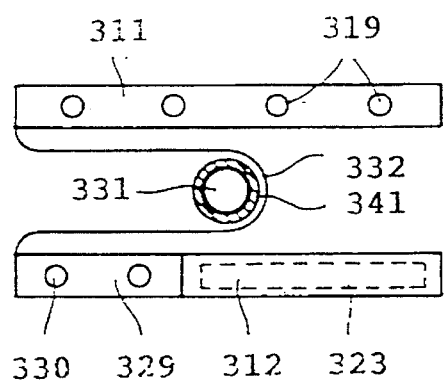
Fig. 4-c
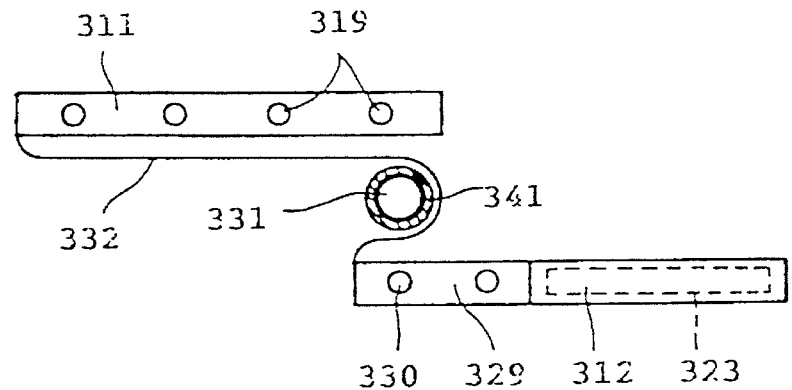

Fig. 7-a
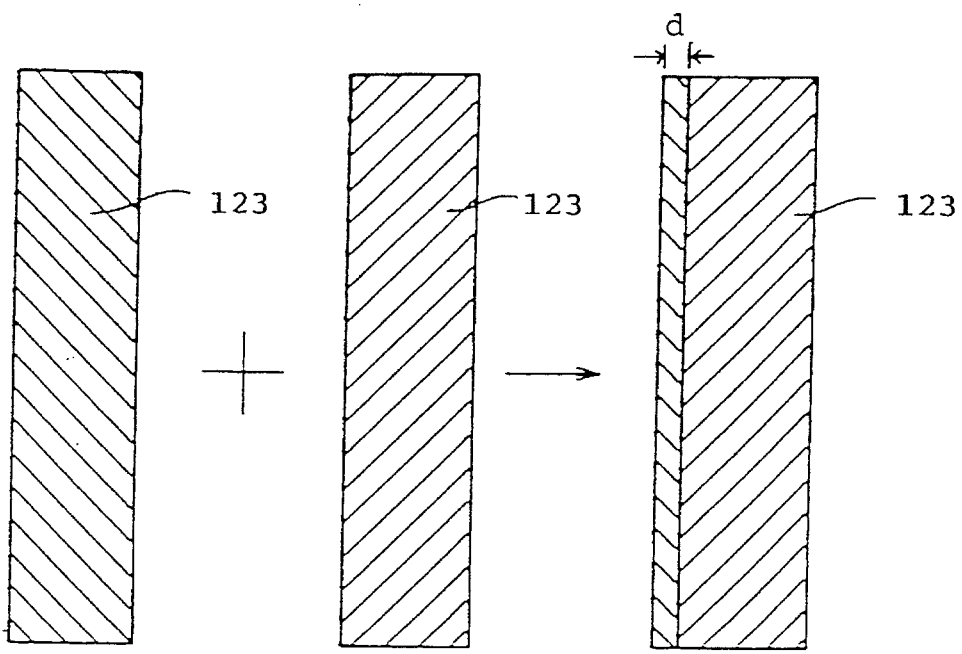
Fig. 7-b
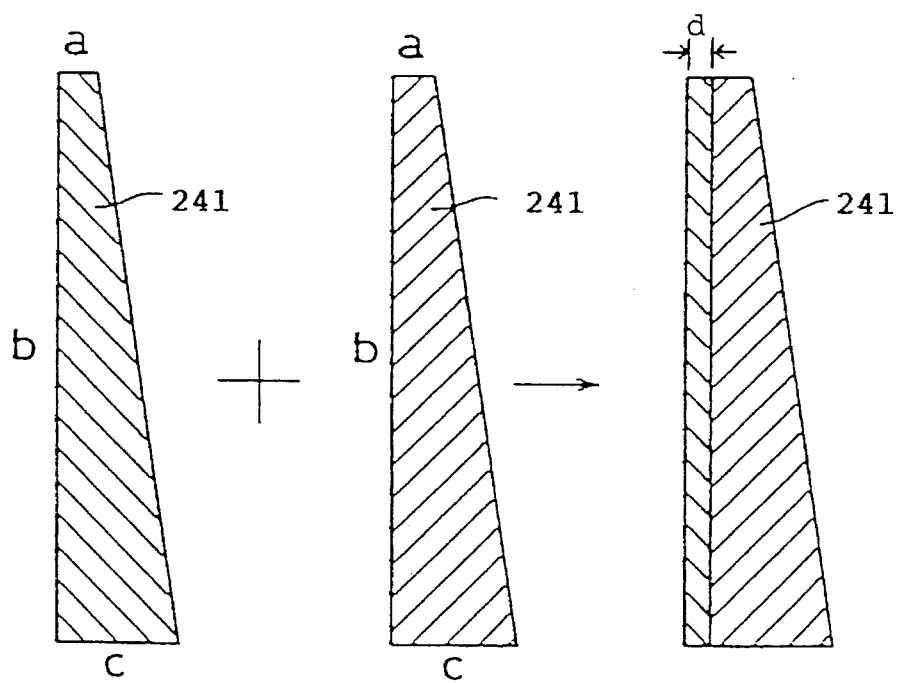

PROCESS FOR MAKING A CYLINDRICAL PRODUCT OF FIBER REINFORCEMENT-THERMOPLASTIC RESIN COMPOSITE

FIELD OF THE INVENTION

The present invention relates to a process for producing a cylindrical product such as a cylindrical intermediate for use in molding a fiber-reinforced thermoplastic resin pipe or a fiber-reinforced thermoplastic resin pipe, and an apparatus for producing the cylindrical product. More particularly, the present invention relates to a process in which a sheet of a fiber reinforcement-thermoplastic resin composite is wound on a mandrel to produce the cylindrical product, and an apparatus for producing the cylindrical product.

BACKGROUND OF THE INVENTION

Fiber-reinforced resin pipes containing a thermoset resin or a thermoplastic resin as the matrix resin conventionally have been produced by several winding techniques including the filament winding method, the tape winding method, and the sheet winding method. These winding methods are advantageous when applied to a fiber reinforcement impregnated with a thermosetting matrix resin having a relatively low viscosity and having draping properties (flexibility) and tackiness at room temperature. These techniques are in practical use for pipe production.

A pipe-shaped object made of a fiber-reinforced thermoplastic resin has been proposed. It is expected that this material can be molded in a shorter time than pipes made of a fiber-reinforced thermoset resin. Also, pipes made of a fiber-reinforced thermoplastic resin have superior toughness, impact resistance, vibration-damping property and other superior material properties as compared to pipes made of a fiber-reinforced thermoset resin. Additionally, fiber-reinforced thermoplastic resin pipe is receiving attention because of its suitability for recycling, which property is desirable for protection of the environment.

In the present invention, materials used for production of a fiber reinforced thermoplastic resin product containing a fiber reinforcement and a thermoplastic resin as a matrix resin is called "a fiber reinforcement-thermoplastic resin composite" or simply by "a composite". The composites are roughly divided into post-impregnation type and pre-impregnation type composites. The post-impregnation type material, which comprises a fiber reinforcement and a fibrous matrix resin (in the form of, for example, a fabric, a mat, a knit cloth) or a powdery matrix resin (where a resin powder is dispersed among filaments), has draping property (flexibility) at room temperature. This is because the reinforcement fibers have not been bonded to one another with the matrix resin. However, the material is not tacky at room temperature (generally from 20° to 25° C.). This type of material is described, for example, in JP-A-60-28543, JP-A-1-92232, and JP-A-2-14039. (The term "JP-A" as used herein means as "unexamined published Japanese patent application".) The pre-impregnation type material, i.e., a fiber-reinforced thermoplastic resin-impregnated material (prepreg), which is produced by impregnating a fiber reinforcement with a matrix resin, for example, by a solvent method or a hot-melt method, has neither draping property nor tackiness at room temperature. This is because the reinforcement fibers have been bonded to one another with the matrix resin. This type of material is described, for example, in JP-A-52-3985 (U.S. Pat. No. 3,742,106), JP-B-58-29651, and JP-B-4-12894 (U.S. Pat. No. 4,897,286). (The term "JP-B" as used herein means an "examined Japanese patent publication".)

Since the composites are not tacky at room temperature, and among them the prepregs also do not exhibit draping property, application of the aforementioned winding methods to composites conventionally has been difficult. It is, however, desirable to use a sheet winding method in order to take advantage of characteristics of the composites and to improve the efficiency of pipe production.

For example, the technique disclosed in International Publication No. WO 90-09272 is an application of the above winding method to the production of a cylindrical intermediate for use in molding a fiber reinforced thermoplastic resin pipe. However, the winding procedure in this technique employs a manual operation, namely, hand lay-up molding at appropriate stages. In this operation, the prepreg is provisionally fixed to the mandrel, or the prepreg is previously wound on a mandrel with a soldering iron or the like in order to prevent the wound sheet from becoming loose and to diminish interlaminar gaps. This prior art technique necessitates such a manual operation, and this results in reduced production efficiency.

The process disclosed, e.g., in JP-A-5-69492 seeks to improve such low production efficiency. In this prior art technique, a melted resin of the same kind as the matrix resin of a thermoplastic resin prepreg sheet is used as an adhesive in order to improve the efficiency of the prepreg-winding operation. However, this method still includes a manual operation.

SUMMARY OF THE INVENTION

A first object of the present invention is to provide a process and an apparatus for winding a fiber reinforcement-thermoplastic resin composite sheet, which process has improved production efficiency of a cylindrical product.

A second object of the present invention is to provide a process and an apparatus for winding a fiber reinforcement-thermoplastic resin composite sheet, which process has improved production efficiency of a cylindrical intermediate for use in molding a fiber reinforced thermoplastic resin pipe, and to enable mass production of fiber-reinforced thermoplastic resin pipes having various sectional shapes.

A third object of the present invention is to provide a process and an apparatus for producing a fiber reinforced thermoplastic resin pipe, which process has improved production efficiency of fiber reinforced thermoplastic resin pipes, and to enable mass production of pipes, by winding a sheet of a fiber reinforcement thermoplastic resin composite on a mandrel and completing the molding of the wound shape simultaneously with completion of the winding.

The first object of the present invention can be attained by a method for producing a cylindrical product which comprises disposing a mandrel on a flexible guide sheet which can be formed in the shape of the letter U around the mandrel, heating a fiber reinforcement-thermoplastic resin composite sheet to a temperature not lower than the thermal distortion temperature of the resin and lower than the thermal degradation (decomposition) temperature of the resin, disposing an end of the heated composite sheet at a line of contact of the mandrel with the flexible guide sheet, rolling the mandrel on the guide sheet while moving the guide sheet, said guide sheet forming a shape of the letter U around the mandrel being drawn into the concave portion of the letter U, and the composite sheet disposed between the mandrel and the guide sheet being in intimate contact with the mandrel and the guide sheet, to thereby wind the composite sheet on the mandrel, and then recovering a cylindrical product made from the wound composite sheet.

The second object of the present invention can be attained by the following Method I.

Method I

A process for producing a cylindrical intermediate for use in molding a fiber reinforced thermoplastic resin pipe, which comprises disposing a mandrel on a flexible guide sheet which can be formed in the shape of the letter U around the mandrel, heating a fiber reinforcement-thermoplastic resin composite sheet to a temperature not lower than the thermal distortion temperature of the resin and lower than the fluidizing temperature or the melting temperature of the resin, disposing an end of the heated composite sheet at a line of contact of the mandrel with the flexible guide sheet, rolling the mandrel on the guide sheet while moving the guide sheet, said guide sheet forming a shape of the letter U around the mandrel being drawn into the concave portion of the letter U, and the composite sheet disposed between the mandrel and the guide sheet being in intimate contact with the mandrel and the guide sheet, to thereby wind the composite sheet on the mandrel, and then recovering a cylindrical product made from the wound composite sheet.

The third object of the present invention can be attained by the following Method II.

Method II

A process for producing a fiber-reinforced thermoplastic resin pipe, which comprises disposing a mandrel on a flexible guide sheet which can be formed in the shape of the letter U around the mandrel, heating a fiber reinfocement-thermoplastic resin composite sheet to a temperature which is higher than the melting temperature or fluidization temperature of the resin of the composite and is lower than the thermal degradation temperature of the resin, disposing an end of the heated composite sheet at a line of contact of the mandrel with the flexible guide sheet, rolling the mandrel on the guide sheet while moving the guide sheet, said guide sheet forming a shape of the letter U around the mandrel being drawn into the concave portion of the letter U, and the composite sheet disposed between the mandrel and the guide sheet being contacted with the mandrel and the guide sheet, to thereby wind the composite sheet on the mandrel, then cooling the composite sheet to a temperature lower than the melting point or fluidization point of the resin of the composite sheet, and then recovering a fiber-reinforced thermoplastic resin pipe made from the wound composite sheet.

The above described methods can be carried out using an apparatus for producing a cylindrical product of a fiber reinforcement-thermoplastic resin composite, which comprises a mandrel having a surface for winding a fiber reinforcement-thermoplastic resin composite sheet thereon to impart a cylindrical shape to the composite sheet, a first plate and a second plate which are disposed face to face at opposite sides of and in the vicinity of the surface of the mandrel wherein the gap between each of the plates and the surface of the mandrel can be varied, a flexible guide sheet having first and second ends which can be bent in the shape of the letter U around the mandrel, wherein one of the ends of the guide sheet is fixed to the first plate and other end of the guide sheet is fixed to the second plate, so that the guide sheet can wind along the mandrel forming the letter U between the plates when the plates move relatively, a moving means for moving at least one of the first and second plates relative to the other forming concave along the surface of the mandrel when rolling the mandrel, and a heating means for heating a contacting portion of the mandrel and the guide sheet at which contacting portion the guide sheet starts to wind on the mandrel when at least one of the two plates is moved relatively to the other plate.

The apparatus for use in Method II is the apparatus which usually further comprises a cooling means.

BRIEF DESCRIPTION OF DRAWINGS

FIG. 1-a is a side view of the main part of an apparatus for use in the process of the present invention for producing a straight cylindrical product.

FIG. 1-b is a front view of the main part of an apparatus in accordance with this invention.

FIG. 1-c is a side view illustrating a winding operation using an apparatus in accordance with this invention.

FIG. 1-d is a side view illustrating a winding operation using an apparatus in accordance with this invention

FIGS. 4-a to 4-c are sectional views illustrating a production process using an aparatus for producing a straight pipe in accordance with this invention.

FIG. 7-a is a plan view showing the manner in which composite sheets for a straight pipe are bonded together in accordance with this invention.

FIG. 7-b is a plan view showing the manner in which composite sheets for use in producing a tapered pipe are bonded together in accordance with this invention.

DETAILED DESCRIPTION OF THE INVENTION

Figure 2:
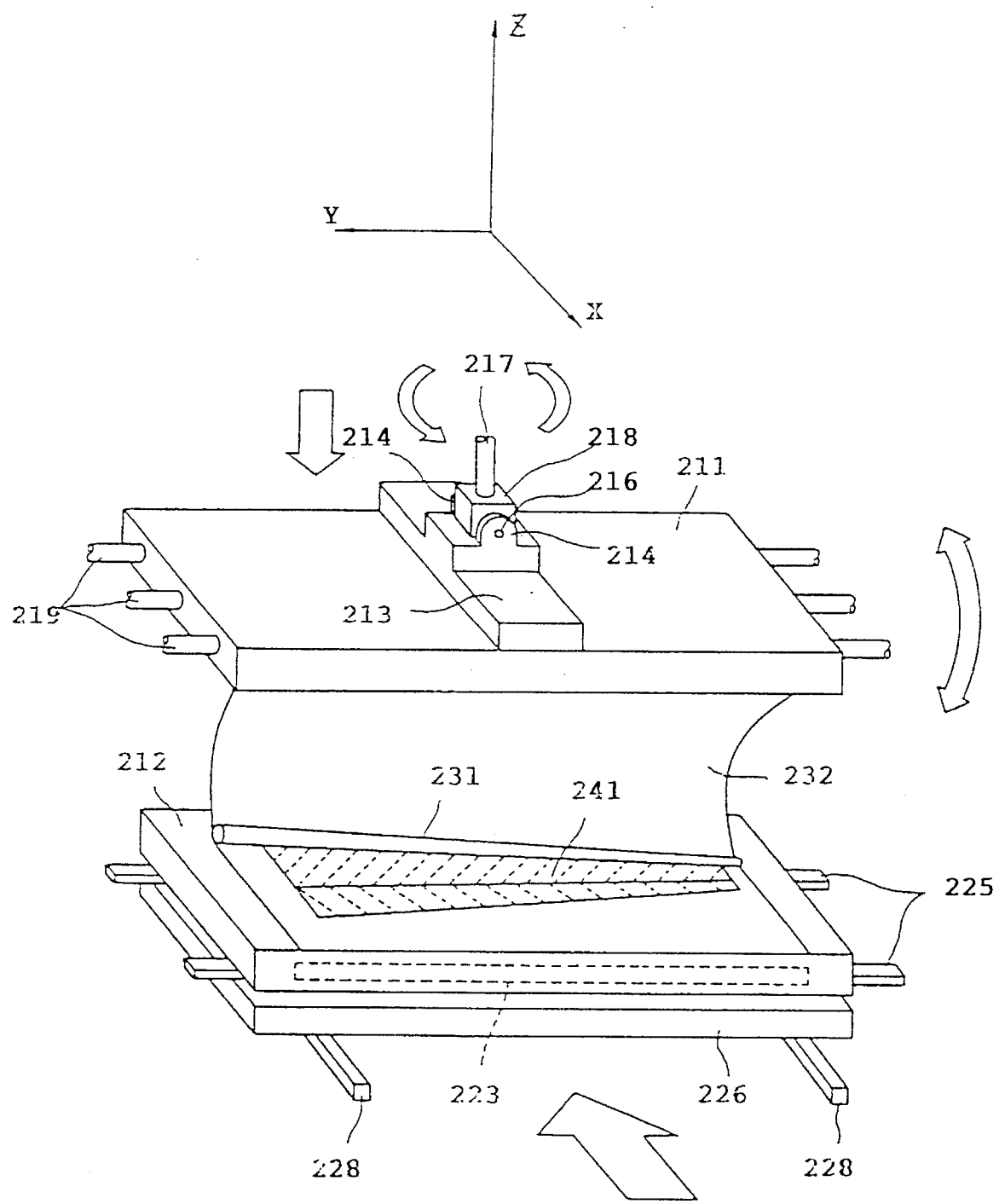
FIG. 2 is an exploded slant view of an apparatus for use in producing a tapered cylindrical product in accordance with this invention.

According to the methods of the present invention, a composite sheet can be intimately and smoothly wound on a mandrel even in the beginning of the winding, without the need for an adhesive or pre-molding.

In the present invention by heating the composite sheet, a draping property (flexibility) and tackiness is imparted thereto. Furthermore, by disposing the composite sheet between the mandrel and a film- or sheet-form flexible guide material (in the present invention, this is referred to as flexible guide sheet) and moving at least one of the plates preferably with application of pressure to the mandrel while allowing the guide sheet to press the composite sheet against the surface of the mandrel, the composite sheet is wound on the mandrel without peeling off the mandrel.

During this winding operation, one of the plates is heated with a heating means, while the other plate is preferably forcibly cooled with a cooling means. As a result, the composite sheet which is placed on the guide sheet and has been softened can be solidified while proceeding to wind the composite sheet continuously on the mandrel.

When the cylindrical product is formed by winding the composite sheet on the mandrel two round or more of the winding according to the present invention is carried out as follows:

After the mandrel is rolled one round as described above, the starting part of the sheet which has been shaped corresponding to the contour of the mandrel is reheated. The reheated part comes into contact with an unwound part of the composite sheet. In Method II, tenacious interlaminar adhesion by fusion bonding can be attained at this part. By repeating such an operation, the composite sheet is continuously wound on the mandrel until the sheet makes a necessary number of rounds on the mandrel.

According to Method I, a cylindrical intermediate for use in molding a fiber-reinforced thermoplastic resin pipe is produced at improved efficiency.

The cylindrical intermediate obtained in Method I is subjected to molding to obtain a pipe as described in detail below.

Cylindical intermediates obtained in Method I can be subjected to pipe forming molding to obtain pipes of various sectional shapes. In this state, the thus obtained intermediate may not have sufficient mechanical properties (as those of a molded final product), however, Method I has merits in that the operating temperature is comparatively low; since the cooling step may not be applied to the process, the cost for equipment is low; for molding it to pipe either external- or internal- pressure method can be selected; by combining two or more types of intermediates, a pipe comprising layers different from each other with respect to compositions thereof or pipes having various thickness can be obtained; the surface characteristics (glossy, frosted, etc.,) can be selected upon molding; and easy to produce a pipe having a larger thickness.

According to Method II of the present invention, the composite sheet is heated to a temperature that is higher than the melting temperature or fluidization temperature of the matrix resin during the winding operation. After a predetermined number of rounds of winding are thus made, the composite sheet wound on the mandrel is preferably sent to a cooling zone formed by a second forced-cooling means disposed in or on one of the first (e.g., upper) plate and the second (e.g., lower) plate which is located on the heating side. As a result, the composite sheet is cooled and solidified at the final stage of the winding, and a pipe shape is imparted to the composite. Thus, a fiber-reinforced thermoplastic resin pipe is directly produced from the composite sheet in an extremely short time period without conducting further operations such as molding.

Fiber reinforcements that can be used in the process of the present invention include- carbon fibers, glass fibers, aromatic polyamide fibers, silicon carbide fibers, boron fibers, and alumina fibers. However, the fiber reinforcement for use in this invention should not be construed as being limited thereto. With respect to fiber configuration of the reinforcement, a unidirectional-fiber material (a material wherein fibers are arrenged in one direction), a fabric, a mat, etc. may be used. In the case of a unidirectional-fiber material or a fabric, the winding angle on the mandrel for fibers is also not particularly limited.

The matrix resin reinforced with the reinforcement described above is not particularly limited, and thermoplastic resins are usable as the matrix resin without particular limitation. Examples thereof include a polysulfone, a polyethersulfone, a polyetherketone, a polyetheretherketone, an aromatic polyamide, an aromatic polyester, an aromatic polycarbonate, a polyetherimide, a poly(arylene oxide), a thermoplastic polyimide, a poly(amide-imide), a poly(phenylene sulfide), a polyethylene and polypropylene.

The fiber content of the composite is preferably 20 to 70 volume %, more preferably 45 to 65 volume %, and particularly preferably 50 to 60 volume %.

If a prepreg is used in the present invention, preparation of a bulky product can be avoided, and fiber disorder in the composite can also be avoided. Furthermore, considerably severe pressure conditions and a prolonged molding time are not required in order to attain sufficient resin infiltration during molding. A prepreg is thus especially suited for efficient pipe molding. Especially, in Method II, a prepreg in which the spaces among constituent fibers are filled with a thermoplastic resin as completely as possible to form a matrix layer is preferred. It is important to use a sufficiently impregnated fiber reinforcement produced, for example, by the method disclosed in JP-B-4-12894. (The term "JP-B" as used herein means an "examined Japanese Patent publication.") This is because when such a prepreg is used, a void-free pipe can be obtained simply by contacting prepreg layers to each other to fusion-bond the layers without having to treat the prepreg under heat-pressing conditions ordinarily used for impregnating a resin into a reinforcement. Another advantage of the use of such a prepreg is that the production efficiency is improved because the product is obtained only through the fusion bonding of prepreg layers.

The dimensions of the composite sheet are not particularly limited. However, the thickness of the composite sheet is preferably 5 mm or less, more preferably 1 mm or less to allow for sufficient heating or cooling of the composite sheet over its entire thickness within a short time period during the winding thereof on a mandrel. In view of handleability, the composite sheet generally has dimensions of about from 100 to 1000 mm in the direction of the axis of the pipe to be produced, and about from 10 to 600 mm in the direction of winding. A pipe with a thick wall can be produced by performing two or more winding operations. Usually two or more of the composite sheets are superposed and bonded to each other, and wound onto the mandrel. In order to make the end of the sheets on the mandrel to be a smooth surface, it is preferred that sheets are shifted at the end thereof in the direction of the winding in a width (shown by d in FIGS. 7-*a* and 7-*b*) corresponding to ¼ to ½ of the length of the circumference of the section of the mandrel.

The flexible guide sheet for use in the process of this invention for winding a composite sheet on a mandrel should have draping properties (flexibility) so as to come into intimate contact with the mandrel and should also have heat resistance so as to withstand heating temperatures. The guide sheet preferably has excellent release properties. Examples of such a material having excellent release properties include fluorine-containing resin films, coated sheets obtained by coating a heat-resistant fabric, e.g., a glass cloth, with a resin having high release properties, e.g., a fluorine-containing resin, and polyimide or stainless-steel films subjected to a releasing treatment. However, the material of the guide sheet should not be construed as being limited thereto.

The dimentions of the guide sheet are not particularly limited so long as it has a length (length in the direction of the mandrel axis) enough to cover the composite sheet on the mandrel to keep the composite sheet on the mandrel intimately in contact to the mandrel over the whole length of the composite sheet in the direction of the mandrel axis and has a width (the length in the direction vertical to the mandrel axis) enough to cover the surface (to which the composite sheet is wound) of the mandrel at least one round. The thickness of the guide sheet is usually 15 to 100 μm.

During the winding operation, the guide sheet is preferably held under tension in the direction of the movement of the mandrel by controlling the position of the mandrel. This prevents the guide sheet from becoming loose, to thereby provide intimate contact of the composite sheet with the mandrel. A means for this purpose may be provided on the mandrel. It is preferred that the mandrel is pressed on the composite sheet in the direction opposite to the movement direction of the mandrel.

The sectional view of the mandrel may be a circle, an ellipse (the ratio of the longer diameter to the shorter diameter is preferably not larger than 2), or a polygon (preferably a hexagon or higher order polygon). The angles of the polygon are preferably rounded. The largest outer size in the sectional view (outer diameter in the case of a circle) is generally 3 to 150 mm, from the stand point of production efficiency. The shapes of the sectional view at the two ends of the mandrel may be the same or different shapes and/or may have the same or different sizes. The mandrel may be tapered.

The mandrel for use in winding may be solid or hollow. The material of this mandrel is not particularly limited as long as the mandrel can withstand the load and heat imposed thereon in the process of this invention. In order to obtain sufficient releasability of the cylindrical product produced, the mandrel is preferably treated with a release agent or a mandrel having excellent release properties is used.

A flexible guide sheet is disposed so as to be bent along the outer shape of the mandrel generally in the shape of the letter U (in terms of the shape of a section thereof) and is wound on the mandrel over preferably ⅓ to ½ round of the mandrel, more preferably about a half round of the mandrel. One end of the guide sheet is fixed to one of the plates and the other end is fixed to the other plate (for example, at the ends of upper and lower plates, respectively) so that it can form the letter U when the plates moves relatively.

The apparatus is further provided with a heating means in or on one of the plates located on a side from which the guide sheet is sent to the mandrel when one of the plates is moved relative to the other plate in the direction of movement of the mandrel. This heating means raises the temperature of the composite sheet to the required temperature.

When a tapered mandrel is used in the apparatus, a suitable example of an embodiment of the apparatus is that at least one of the plates has a supporting means which supports said plate to be swingable to control the gap between the plates and the mandrel and to be revolvable in the direction of the movement of the mandrel rolling on the surface of the other plate.

The conditions for heating depend on the matrix resin used. In Method I, the lower limit of the heating temperature is not lower than the heat distortion (deformation) temperature (as measured in accordance with ASTM-D648, lead: 18.6 kg/cm$^2$) of the matrix resin used. However, the heating temperature is lower than the fluidizing temperature (in the case of an amorphous resin: the temperature is measured in accordance with ASTM D569-82) or the melting temperature (in the case of a crystalline resin) of the matrix resin, preferably lower than these temperatures by 5° to 80° C., more preferably by 10° to 50° C.

In Method II, the lower limit of the heating temperature is higher than the melting temperature (preferably by 5° to 80° C., more preferably 10° to 50° C.) or fluidization temperature (preferably by 5° to 50° C., more preferably 10° to 30° C.) of the matrix resin used, while the upper limit thereof may be any temperature as long as the matrix resin does not decompose at that temperature. The temperature is preferably not lower than the moldable temperature.

The means for heating is not particularly limited, and an oil heater, steam, an electric heater, ultrasonic, dielectric heating, etc. may be used. This heating may be conducted in such manner that the whole composite sheet is heated or only a part of the prepreg at the starting point of winding on the mandrel is heated.

In the case where the composite sheet which has been wound on the mandrel is forcibly cooled, this cooling may be accomplished either by using a cooling device connected to one of the plates to be cooled or by circulating a cooling medium, e.g., water, compressed air, or oil, directly through the plate to be cooled. The temperature of the thus-cooled plate is not particularly limited, however, it is preferably lower than the glass transition temperature of the matrix resin.

For finally obtaining the products according to the present invention and, especially a fiber-reinforced thermoplastic pipe in Method II, the plate having a heating means is preferably provided with a cooling zone so as to perform final forced cooling, after rounds of winding have been made in a predetermined number (generally 1 to 50), to cool the wound composite sheet desirably to a temperature lower than the glass transition temperature of the matrix resin, preferably to a temperature lower than the heat distortion temperature (as measured according to ASTM-D648, load: 18.6 kg/cm$^2$) of the matrix resin.

For example, as shown in FIG. 4-*a*, a lower plate 312 having a heating means is provided with a cooling zone 329. After the composite sheet layers on mandrel 331 have been fusion-bonded to each other in the winding operation in Method II, the resulting pipe with mandrel 331 is sent to this cooling zone 329. As a result, the pipe can be cooled rapidly. By using the above-described process, the steps of winding, fusion-bonding of composite sheet layers, cooling, and product withdrawal from the mandrel in the process for pipe production can be carried out successively within a single apparatus.

In the present invention pressure is preferably applied to the composite sheet (perpendicularly to the surface of the sheet) which is wound on the mandrel through a guide sheet.

The degree of applied pressure preferably is such that the composite sheet can be brought into intimate contact with the mandrel and the mandrel can be rolled smoothly. In Method II, when the winding of the composite sheet has been conducted twice or more to interpose the composite sheet on the mandrel, the pressure should be applied so that the layers of the composite sheets intimately adhere to one onother. In the method of the present invention, application of a pressure load of about from 0.05 to 10 kg/cm (measured at the contact line of the mandrel having the composite sheet wound thereon with each of the plates) is preferred for obtaining intimate contact of the composite sheet with the mandrel and intimate contact between composite sheet layers on the mandrel, and to smoothly wind the composite sheet. More preferably the pressure load is from 0.5 to 5 kg/cm.

Figure 6:
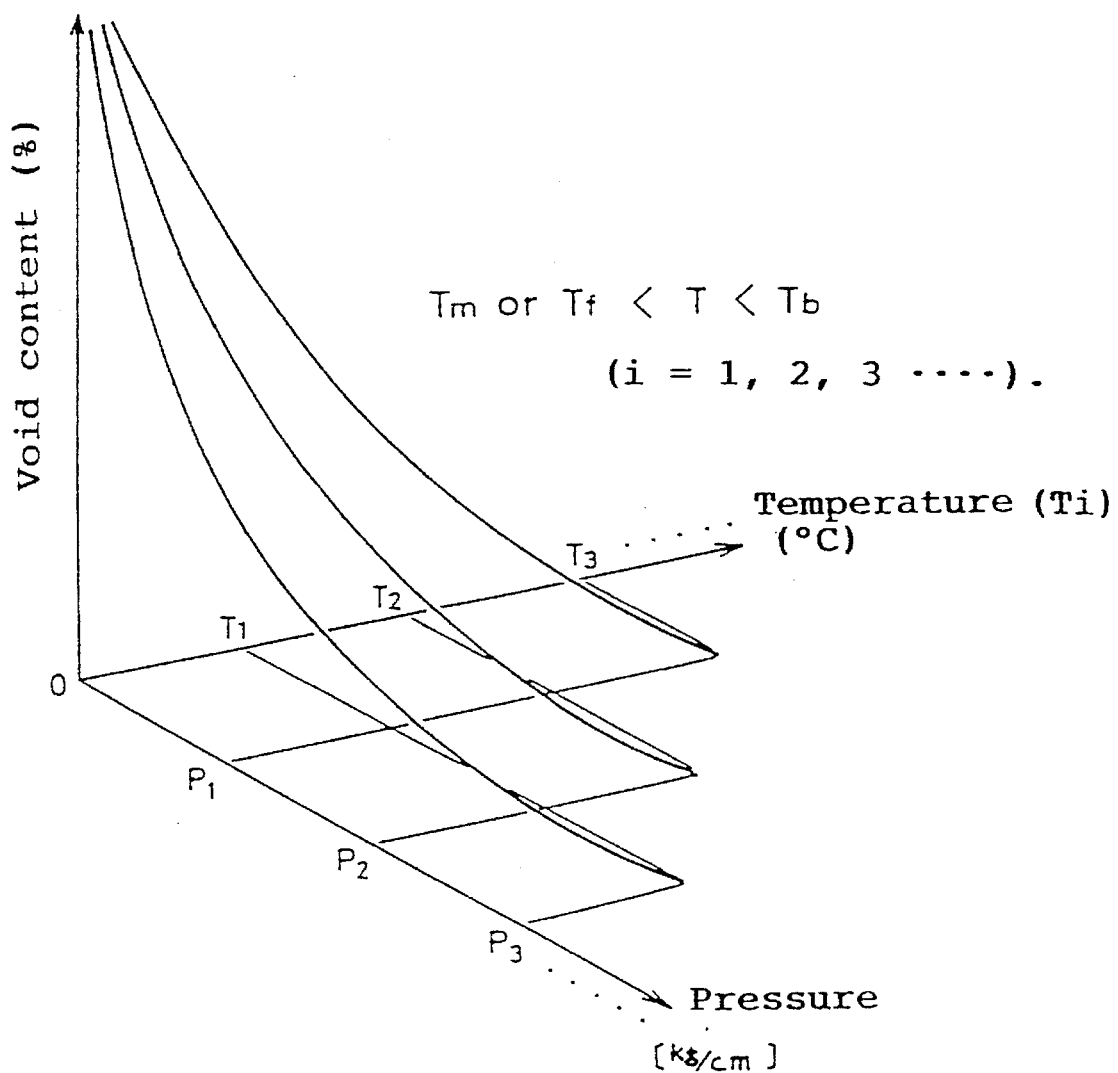
FIG. 6 is a slant view showing the relationship between void content and each of temperature and pressure conditions in accordance with this invention.

FIG. 6 shows the relationship among the heating temperature, pressure and the void content in a molded object produced in Method II at a constant winding rate. In FIG. 6, Tm, Tf and Tb each shows the melting temperature, the fluidizing temperature, and the thermal degradation temperature of the resin, respectively, and Ti shows the heating temperature. A preferred temperature and a pressure can be easily found in the range of from a temperature higher than the melting temperature or fluidization temperature of the matrix resin to a temperature lower than the thermal degradation temperature of the resin, although, the temperature conditions vary depending on the kind of the matrix resin in the composite sheet. A void-free product can be obtained by regulating the temperature and the pressure as shown in FIG. 6, if the winding rate is constant. The void content is preferably not more than 1% and more preferably not more than 0.3% by volume.

The composite sheet which is wound and shaped along the surface of the mandrel may be solidified by cooling. This is usually done at about every ½ round of winding with a forced-cooling means disposed in the plate located on the side to which the guide sheet is sent via the mandrel when at least one of the plates is moved relative to the other. Final cooling may then be conducted with a second forced-cooling means, which is disposed in or on the plate having the heating means. In this manner, the composite sheet wound on the mandrel comes into contact with the second forced-cooling means after completion of the winding.

The rate of the winding of the composite sheet on the mandrel can be increased by lowering the cooling temperature, provided that the heating temperature is fixed. That is, the winding rate can be regulated by changing the cooling temperature. To promote production efficiency and easiness of winding, the cooling conditions are preferably determined so as to result in a winding rate of 0.5 to 50 m/min, more preferably 5 to 10 m/min.

The cylindrical intermediate obtained in Method I is then molded by heating and pressing to obtain a fiber-reinforced thermoplastic resin pipe. For this molding, any molding technique used in ordinary pipe molding may be employed without particular limitation. Such techniques include the internal-pressure molding method and the external-pressure molding method.

Figure 8:
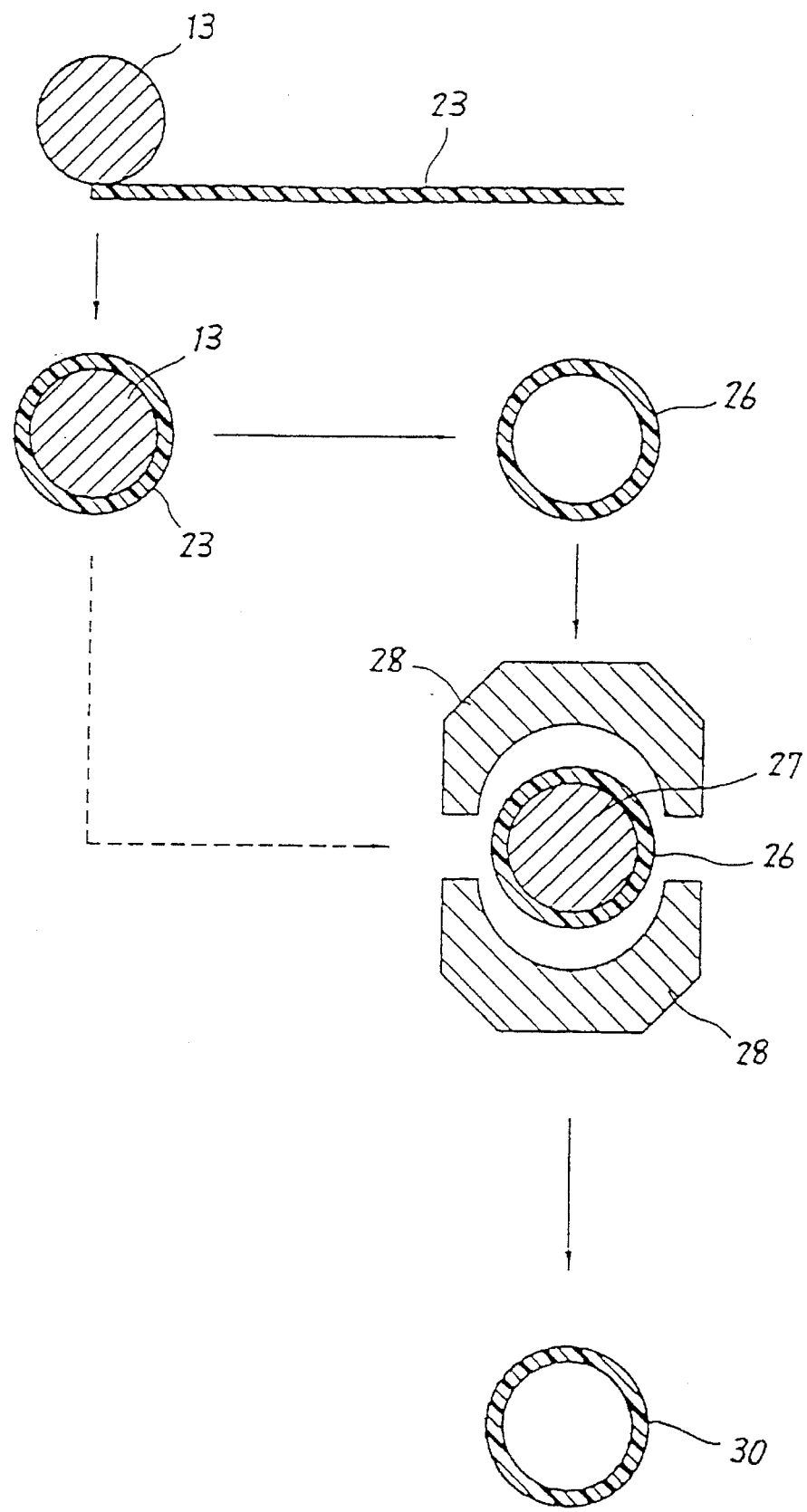
FIG. 8 is sectional views showing steps of a process for producing a fiber reinforced thermoplastic resin pipe from a cylindrical intermediate in accordance with this invention.

More particularly, the external-pressure molding method may comprise wrapping the cylindrical intermediate laid up on a mandrel with a shrinkable tape or inserting the same into a shrinkable tube, and heating the resulting structure to press the intermediate by means of thermal shrinkage of the tape or tube. Alternatively, the intermediate laid up on a mandrel may be placed in a pressure mold to externally press the intermediate with heating. On the other hand, the internal-pressure molding method may be carried out, for example, as illustrated in FIG. 8. That is, after composite sheet 23 has been laid up on mandrel 13, mandrel 13 is removed. A flexible bag capable of sealing or a thermally expandable substance 27 is then inserted into the resulting cylindrical intermediate 26. This cylindrical intermediate 26 with the expandable substance 27 is placed in a mold 28, and is heated while being pressed internally to thereby mold pipe 30.

Examples of the thermally expandable substance 27 include a silicon rubber or a fluorine-containing resin. Examples of the fluorine-containing resin include polytetrafluoroethylene (PTFE), poly(fluoroalkoxyethylene) resins (PFA), and fluorinated ethylene-propylene-ether copolymers (FEP).

The internal-pressure molding method, in which the cylindrical intermediate is heated while being pressed internally, has the following advantages. Since internal pressure is applied so as to radially expand the intermediate, the fibers are less disordered during molding. Furthermore, in the case of using a flexible bag as an expandable substance, a straight or curved profile pipe having an elliptic or polygonal shape section or another shape can be easily obtained by the internal-pressure molding method by suitably selecting the outer mold.

According to Method II, a pipe which is substantially void free can be obtained by fusion-bonding composite sheet layers in the manner described above. Furthermore, the steps of winding, fusion-bonding of prepreg layers, cooling, and product withdrawal in the process for pipe production can be carried out successively and smoothly within a single apparatus. As a result, the efficiency of production of fiber-reinforced thermoplastic resin pipes can be improved.

An apparatus for practicing the process of the present invention, in which a composite sheet is wound on a mandrel to produce a cylindrical product, that is, a cylindrical intermediate or a pipe is explained below and in the following Examples by reference to FIGS. 1 to 5.

FIGS. 1-*a* to 1-*d* and 3 show examples of apparatuses for carry out the method of the present invention, especially suitably carry out Method I of the present invention. The apparatus indicated in FIG. 1-*a* to 1-*d* has a mandrel 113 which, for example, has a cylindrical shape. A movable plate 116 and a stationary plate 111 are disposed on opposite sides of the mandrel 113 (e.g., at upper side and lower side, respectively) so as to sandwich the mandrel 113 therebetween from opposite sides. A heating means 112 is disposed within or on one of these plates, for example, the stationary plate 111.

A flexible guide sheet 122 for use in winding a composite sheet 123 on the mandrel 113 is disposed in such manner that guide sheet 122 is able to be bent in the shape of the letter U so as to be wound on mandrel 113 over about a half round. Furthermore, both ends of the guide sheet 122 are fixed to movable plate 116 and stationary plate 111, respectively, at the end of the plates in the direction of the movement of the mandrel. The composite sheet 123 is placed on the guide sheet 122 on the heated stationary plate 111 so that the front edge of sheet 123 is located along the line where the guide sheet 122 is in contact with the mandrel 113.

The movable plate 116 is then moved relative to the stationary plate 111 and, simultaneously therewith, the mandrel 113 is rolled on the guide sheet 122 on the heated stationary plate 111. As a result, the composite sheet 123 which is disposed on the guide sheet 122 at the heated stationary plate 111 and which has been heated with the heating means 112 is clamped by guide sheet 122 and mandrel 113 and is wound on mandrel 113. The composite sheet 123 which has thus been wound on mandrel 113 is solidified by cooling preferably with cooling means 118 generally disposed on or in the other plate, i.e., the movable plate 116.

The constitution of the apparatus for producing a cylindrical product is not limited to the above described apparatus. For example, the two plates are not particularly limited as long as one of the two plates moves relative to the other. Furthermore, the positions of the heating means and the forced-cooling means are not particularly limited, as long as the heating means is disposed on or in the plate located on the side from which the guide sheet is sent with the composite sheet to the mandrel, and the forced-cooling means is disposed on or in the plate located on the side to which the guide sheet is sent via the mandrel. That is, the movable plate may be provided with the heating means and the stationary plate may be provided with the forced-cooling means. The composite which has been wound up on the mandrel may also be allowed to cool under ambient conditions. In this case, the forced-cooling means is unnecessary.

When a tapered mandrel is used in the present invention, at least one of two plates, (for example, upper and lower plates) is inclined to conform with the taper of the tapered mandrel and is revolved around an axis perpendicular to the mandrel axis. The other of the two plates is moved in the widthwise (the direction perpendicular to the direction of the axis of the mandrel) and lengthwise (the direction of the axis of the mandrel) directions. As a result, the composite sheet is wound on the tapered mandrel without moving out of position.

Figure 3:
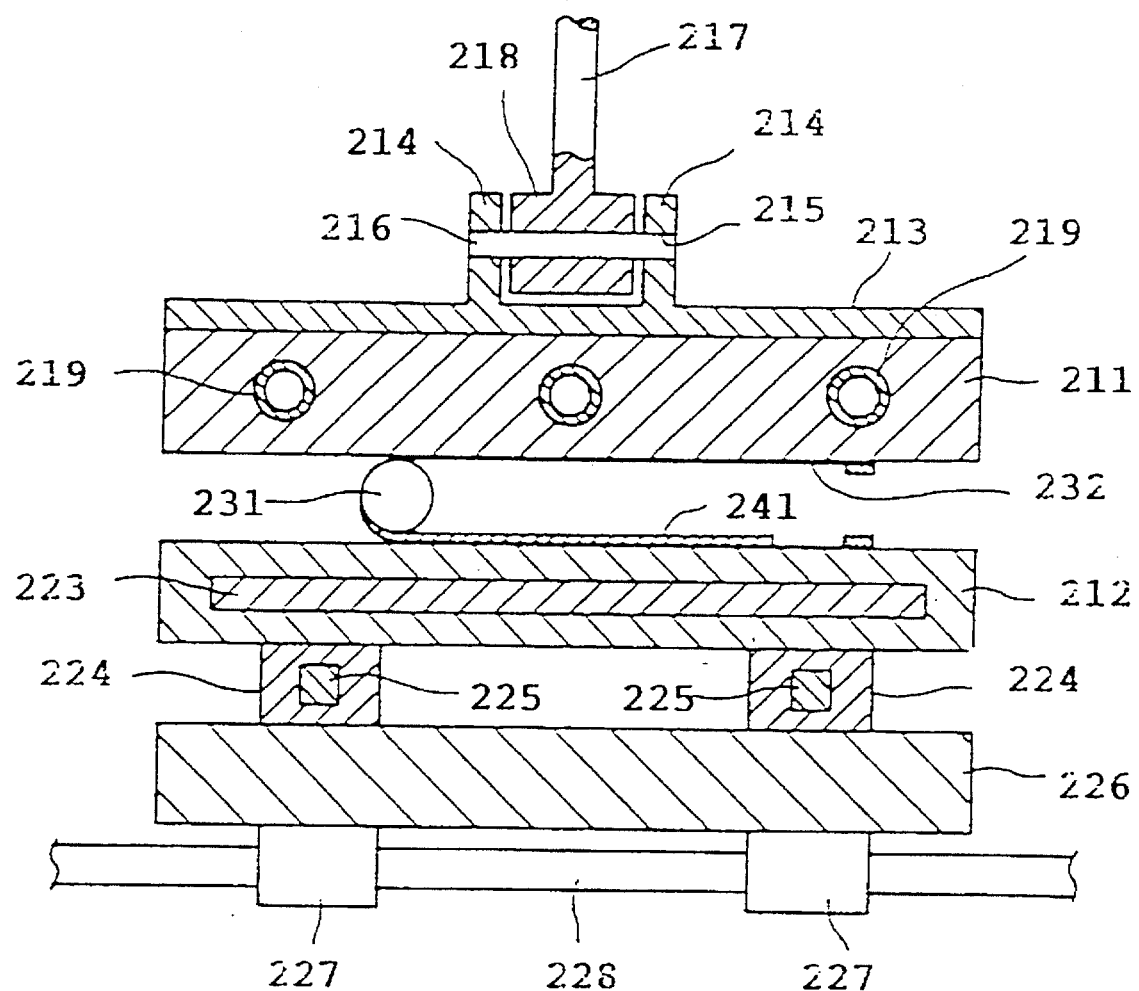
FIG. 3 is a vertical sectional view of the apparatus of FIG. 2.

The apparatus shown in FIGS. 2 and 3 is an embodiment of the apparatus of the present invention for practicing the method of the present invention, especially, Method I or II in which a composite sheet is wound to produce a tapered pipe or an intermediate thereof. This apparatus has first and second plates, for example, an upper plate 211 and a lower plate 212 which are disposed so as to face each other. The upper plate 211 has a supporting plate 213 disposed on the upper side thereof and at the center of the length thereof (in the direction of the Y axis; the contact line of the mandrel and plate 212 at the starting point of winding is defined as the axis Y, the axis perpendicular to the Y axis on plate 212 is defined as axis X and the axis perpendicular to X—Y plane is defined as the Z axis.). This supporting plate 213 has a pair of projections 214 on its upper side, and these projections 214 each has a pin hole 215. A pin 216 extends from one of the pin holes 215 to the other through a base part 218 of a revolution shaft 217. Due to such constitution, upper plate 211 is supported so that it is revolvable on the revolution shaft 217 and is also swingable in such a manner that each end in the lengthwise direction thereof moves up or down.

Within the upper plate 211 is disposed a cooling pipe 219 for moving a cooling medium therethrough. The upper plate 211 can thus be forcibly cooled by means of the medium forcibly circulated through the cooling piping 219. In contrast, the lower plate 212 has, in an inner part thereof, a built-in heater 223 which constitutes a heating means.

The lower plate 212 has guide blocks 224 fixed to the lower side thereof, and the lower plate 212 is supported on these guide blocks 224 so as to be movable on guide rails 225 in the direction of the Y axis. The guide rails 225 are supported at their ends on a base 226, which in turn has guide blocks 227 fixed to the lower side thereof. Base 226 is supported on guide blocks 227 so as to be movable in the direction of the X axis on guide rails 228 extending through guide blocks 227. Consequently, the lower plate 212 is supported so that it is movable in both the X-axis direction and the Y-axis direction through the base 226.

A tapered mandrel 231 is disposed between the lower surface of the upper plate 211 and the upper surface of the lower plate 212, which surfaces face each other. A flexible guide sheet 232 is disposed between the two plates in such manner that mandrel 231 is partly surrounded by the same. This guide sheet 232 is supported on upper plate 211 and lower plate 212, with both of its ends being fixed to the surfaces of the upper plate 211 and the lower plate 212, respectively. As illustrated in FIG. 2, guide sheet 232 is bent in a shape similar to the letter U so as to be wound on the tapered mandrel 232 over about a half round. Due to this constitution, composite sheet 241 can be wound on tapered mandrel 231 with the aid of guide sheet 232.

By a moving means, lower plate 212 is moved relative to the upper plate 211 in the direction of the X axis, during which movement the upper plate 211 is swung on pin 216 so that each end of plate 211 in the lengthwise direction (direction of the Y axis) moves upward or downward. The upper plate 211 is inclined in this manner in accordance with the taper of the mandrel 231. The lower plate 212 is then moved in the direction of the Y axis, while the revolution shaft 217 is revolved. As a result, a fan-shaped locus resulting from development of tapered mandrel 231 can be attained.

When tapered mandrel 231 is rolled, it moves along a fan-shaped locus. Namely, tapered mandrel 231 upon rolling moves along a circle whose center is located on an extension of the axis of mandrel 231. If this circular movement is not attained, mandrel 231 cannot be rolled. Moreover, in the circular movement during rolling, tapered mandrel 231 moves not only in the widthwise direction (direction of the X axis) but also in the direction of the axis thereof (direction of the Y axis). Thus, if movement of plate 212 is limited to linear movement in the widthwise direction thereof (direction of the X axis), mandrel 231 cannot be rolled smoothly.

The upper plate 211 is thus revolvable to attain a fan-shaped revolution resulting from the circular movement of the mandrel. In addition, since the lower plate 212 is movable not only in the widthwise direction (direction of the X axis) but also in the lengthwise direction (direction of the Y axis), the mandrel 231, which actually moves also in the direction of its axis, can be apparently moved linearly in the direction of the Y axis. The tapered mandrel 231 is smoothly rolled in this manner to wind a composite sheet thereon. Due to the above-described system, smooth winding on the tapered mandrel 231 is possible even though lower plate 212 is moved only linearly.

The winding procedure for winding the composite sheet 241 with the apparatus described above is explained below. First, composite sheet 241 is set on the lower plate 212 preheated with heater 223, so that the front end of the composite sheet 241 is sandwiched between mandrel 231 and guide sheet 232. The upper plate 211 descends while mandrel 231 and composite sheet 241 are kept in that state, to thereby secure mandrel 231 and composite sheet 241 to be intimately contacted. During this operation, guide sheet 232 is preferably held under a certain tension so that guide sheet 232 is in intimate contact with the mandrel 231 without becoming loose.

At this stage, upper plate 211 has been swung on pin 216 and is inclined in accordance with the taper of mandrel 231.

As lower plate 212 is moved in the direction of the X axis with upper plate 211 being kept at that state, upper plate 211 revolves on revolution shaft 217 and follows mandrel 231 which rolls while drawing a fan-shaped locus. Lower plate 212 is also moved by means of rails 225 in the direction of the Y axis toward the largest-diameter part of mandrel 231 to cope with the axis-direction stroke of mandrel 231 during rolling. As a result, mandrel 231 can be rolled while attaining a fan-shaped locus resulting from development of mandrel 231.

During this rolling, composite sheet 241 which has been softened by heating with built-in heater 223 disposed in lower plate 212 is pressed against the external surface of mandrel 231 by guide sheet 232. Therefore, composite sheet 241 can be intimately and smoothly wound on mandrel 231 even at the initial stage of the winding. The composite sheet 241 thus wound is forcibly cooled with forced-cooling means comprising cooling pipes 219 disposed in upper plate 211. Thus, the composite sheet 241 wound on mandrel 231 is solidified and the shape thereof is fixed.

The constitution of the apparatus for producing a tapered cylindrical product is not limited to the above described apparatus. For example, plates 211 and 212 are not particularly limited as long as one of the two plates moves relative to the other. Furthermore, heating means 223 and cooling means 219 are not particularly limited, as long as heating means 223 is disposed on or in the plate located on the side from which guide sheet 232 and composite sheet 241 are sent to mandrel 231, and forced-cooling means 219 is disposed on or in the plate located on the side to which guide sheet 232 is sent via the mandrel 231. That is, the movable plate may be provided with forced-cooling means 219 and the fixed plate may be provided with the heating means.

Figure 5:
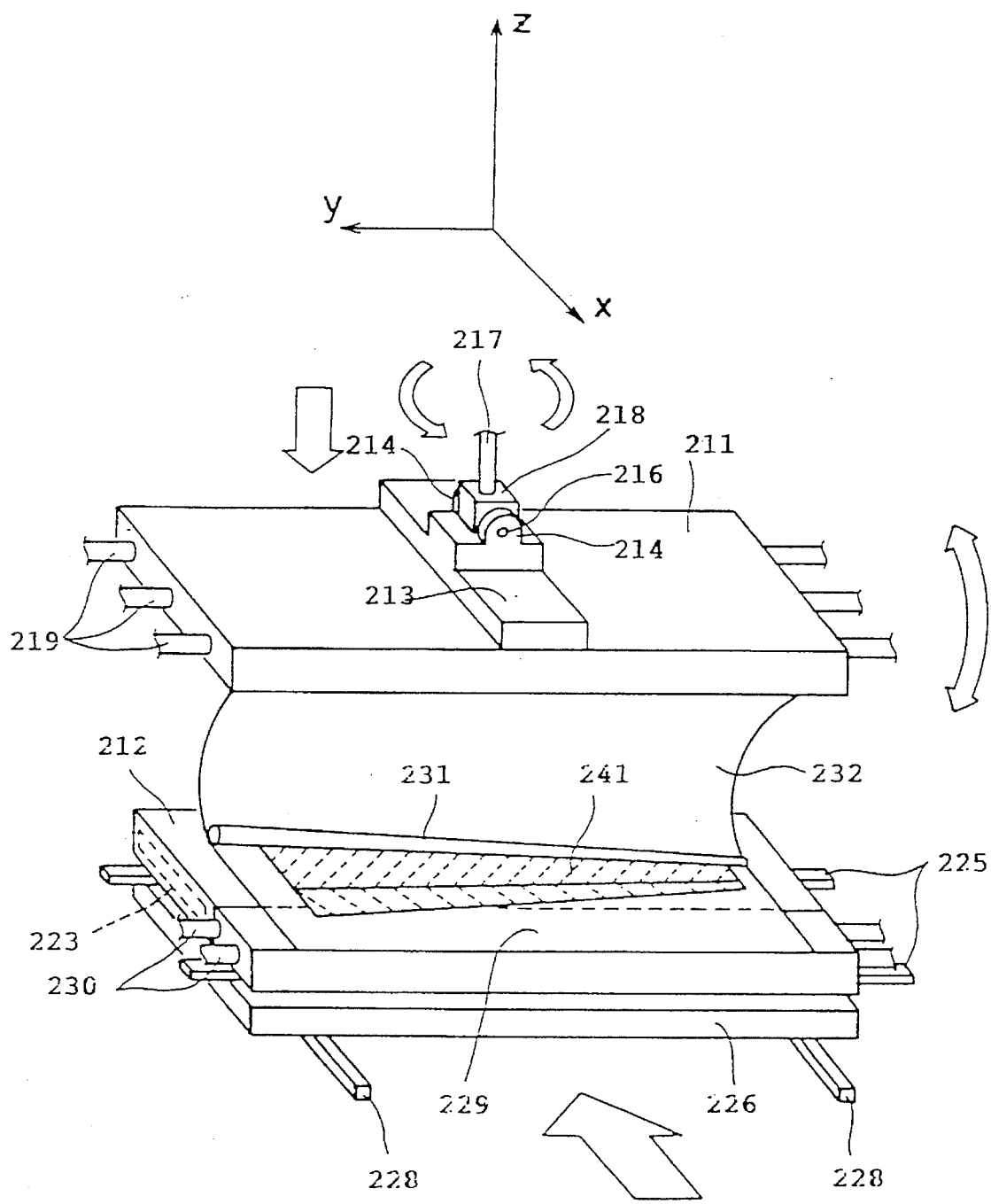
FIG. 5 is a slant view of an apparatus for use in producing a tapered pipe in accordance with this invention.

Examples of apparatuses for efficiently practicing Method II are shown in FIGS. 4 and 5. In FIGS. 4 and 5, the X, Y and Z axis are defined in the same manner as in FIG. 2. FIGS. 4 and 5 are explained in detail in Example 8. They are substantially the same as the apparatuses shown in FIGS. 1 and 2, respectively, except that these apparatuses further have second cooling means 330 on the side of the plate which has heating means 323. As a result, after the composite sheet is completely wound on the mandrel, and with continuous rolling of the mandrel on the plate, the wound composite sheet contacts the portion of the plate which is cooled with the cooling mean and is solidified to form a pipe.

According to the process of the present invention, draping properties and tackiness are imparted to the composite sheet by heating. As a result, the material can be smoothly and intimately wound on a mandrel with the aid of a guide sheet even at the beginning of winding. In addition, by forcibly cooling the wound material with a cooling means, the matrix resin can be solidified during the step of winding the softened composite sheet on the mandrel. Accordingly, manual operations such as hand lay-up molding are unnecessary in this process. Namely, the method of the present invention preferably does not include a manual operation step. As a result, the composite sheet can be wound automatically. Thus the efficiency of preparing a cylindrical intermediate for production of a pipe, or direct production of a pipe from a composite sheet can be improved.

By molding the cylindrical intermediate obtained in Method I, a fiber-reinforced thermoplastic resin pipe can be easily produced. For this molding, molding techniques for use in ordinary pipe molding may be employed without particular limitation. Such techniques include the internal-pressure molding method and the external-pressure molding method.

More particularly, the external-pressure molding method may comprise wrapping the composite sheet laid up on a mandrel with a shrinkable tape or inserting the same into a shrinkable tube, and heating the resulting structure to press the prepreg by means of the thermal shrinkage of the tape or tube. Alternatively, the composite sheet laid up on a mandrel may be placed in a pressure mold to externally press the composite with heating. On the other hand, the internal-pressure molding method may be carried out, for example, as illustrated in FIG. 8. That is, after composite sheet 23 has been laid up on mandrel 13, mandrel 13 is removed. A flexible bag capable of sealing or a thermally expandable substance 27 is then inserted into the resulting cylindrical intermediate 26 made of the prepreg. This cylindrical intermediate 26 with the expandable substance 27 is placed in a mold 28, and is heated while being pressed internally to thereby mold pipe 30.

The internal-pressure molding method, in which the cylindrical intermediate is heated while being pressed internally, has the following advantages. Since internal pressure is applied so as to radially expand the intermediate, the fibers are less disordered during molding. Furthermore, in the case of using a flexible bag as an expandable substance, a straight or curved profile pipe having an elliptic or polygonal shape section or another shape can be easily obtained by the internal-pressure molding method by suitably selecting the outer mold.

EXAMPLE 1

Besfight/polycarbonate (PC) prepregs (manufactured by Toho Rayon Co., Ltd.), comprising carbon fibers that are aligned in one direction, were used as a prepreg sheet. Besfight is a trade name of carbon fiber having a mean diameter of 7 μm mannufactured by Toho Rayon Co., Ltd. The polycarbonate had polymerization units and characteristics as shown below.

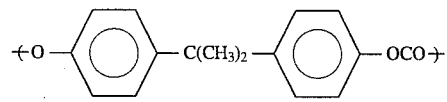

Molecular Weight=25000

Glass transition temperature=145°–150° C.

Melting Temperature=240° C.,

Heat Distortion Temperature=137°–142° C.

The weight of carbon fiber in the prepreg was 162 g/m², and the prepreg had a resin content (hereinafter referred to as "RC" (wt %)) of 38% and a thickness of 0.25 mm.

Prepreg sheets 123 were superposed so as to be wound at fiber orientations of ±45° with respect to the direction of the axis of the mandrel as shown in FIG. 7. The prepreg sheet reinforcement had dimensions of 150 mm in the direction of the axis of the mandrel and 55 mm in the direction of winding. The sheets were superposed with an offset of 11 mm (d in FIG. 7) at the ends of the sheets to yield a pipe having a wall thickness of about 0.45 mm. The superposed prepreg sheets were fused at some spots to prevent the sheets from slipping, and the sheets were wound on a mandrel having an outer diameter of 15 mm using the winding method and conditions shown in Table 1.

The apparatus used in this Example for producing a cylindrical intermediate had the structure shown in FIGS. 1-a and 1-b. This apparatus comprised base 110, stationary plate 111 disposed on the base 110, plate heater 112 disposed within stationary plate 111 as shown in FIG. 1-*a*, and mandrel 113 movable by rolling on stationary plate 111.

The apparatus further comprised movable plate 116 disposed above mandrel 113. Plate 116 is movable along the lower sides of rails 118 by means of guide bearings 117 disposed on both sides of plate 116 as shown in FIGS. 1-*a* to 1-*d*. Cooler 119 is disposed on the upper side of movable plate 116 so that a prepreg is cooled with this cooler 119 through movable plate 116. This apparatus employs a Kapton 200H film (trade name of a polyimide film having a thickness of 50 μm; manufactured by Du Pont-Toray Co., Ltd.) as guide sheet 122.

Prepreg sheet 123 is placed on guide sheet 122 on the side of the stationary plate 111 as shown in FIG. 1-*c*. Movable plate 116 with cooler 119 is then lowered. Movable plate 116 is moved by sliding it on guide bearings 117, while a pressure (load) is applied to the mandrel. In accordance with the movement of movable plate 116, the guide sheet 122 rolls mandrel 113 on the stationary plate 111 while maintaining intimate contact with the mandrel 113. As a result, prepreg sheet 123, which has been heated (210° C.) on guide sheet 122 with heater 112 and hence has draping properties and tackiness and which prepreg sheet 123 is disposed between mandrel 113 and guide sheet 122, is intimately wound on the external surface of mandrel 113. In this winding, that part of prepreg sheet 123 which is located above mandrel 113 comes into contact with movable plate 116 which is forcibly cooled with cooler 119. Consequently, the prepreg sheet is solidified simultaneously with winding on mandrel 113. A cylindrical intermediate for use in molding a fiber-reinforced thermoplastic resin pipe is thus obtained.

The cylindrical intermediate obtained under the conditions shown in Table 1 below had a satisfactory appearance with no fiber disorder. This cylindrical intermediate had an almost uniform wall thickness except the part corresponding to the rear edge part of the prepreg sheet. A cylindrical rod of a polytetrafluoroethylene (PTFE) having an outer diameter of 13.6 mm was then inserted into this cylindrical intermediate, and this structure was placed in a mold and heated to 320° C. in a $N_2$ atmosphere to expand the cylindrical PTFE rod. Thus, pipe molding was performed by the internal-pressure molding method. As a result, a fiber-reinforced thermoplastic resin pipe having an outer diameter of 14.45 mm and a wall thickness of 0.45 mm was obtained which had a satisfactory appearance with no fiber disorder and was free from internal voids, as shown in Table 1.

COMPARATIVE EXAMPLE 1

The same unidirectional Besfight/PC prepregs as in Example 1 were used as a prepreg sheet. The prepreg sheet was wound on a mandrel by a hand lay-up method with partial heating of the prepreg sheet including heating the portion contacting the mandrel as shown in Table 1, to thereby obtain a cylindrical intermediate for use in molding a fiber-reinforced thermoplastic resin pipe. The cylindrical intermediate thus obtained had insufficient adhesion between the superposed prepreg layers, was bulky, and also had fiber disorder.

This cylindrical intermediate tended to crack in the fiber direction, and particularly at the ends of the intermediate. It was therefore necessary to repair such a part by, e.g., provisional bonding with a soldering iron or the like. This cylindrical intermediate was subjected to molding. As a result, as shown in Table 1, the pipe thus obtained had a poor appearance with fiber disorder and contained voids. This is because of insufficient elimination of vacant spaces formed between superposed prepreg layers in production of the cylindrical intermediate.

EXAMPLE 2

The same unidirectional Besfight/PC prepreg sheet as in Example 1 was used as a prepreg sheet. The prepreg sheet had a dimension of 150 mm in each of the axis direction and the winding direction so as to obtain a pipe with a wall thickness of about 0.5 mm. The prepreg sheet was set so as to be wound at a fiber orientation of 90° with respect to the direction of the axis of the mandrel. Using the same apparatus as in Example 1, this prepreg was wound on a mandrel having an outer diameter of 15 mm. The same winding method and conditions as in Example 1 were used as shown in Table 1.

The thus-obtained cylindrical intermediate for use in molding a fiber-reinforced thermoplastic resin pipe had a satisfactory appearance with no fiber disorder and had a uniform wall thickness except for the part corresponding to the rear edge part of the prepreg sheet, as shown in Table 1. This cylindrical intermediate was subjected to molding in the same manner as Example 1. As a result, a fiber-reinforced thermoplastic resin pipe was obtained which, as shown in Table 1, had a satisfactory appearance with no fiber disorder and was free from internal voids as in Example 1.

COMPARATIVE EXAMPLE 2

The same unidirectional Besfight/PC prepreg sheet as in Example 2 was used to produce a cylindrical intermediate for a fiber-reinforced thermoplastic resin pipe by a hand lay-up method with partial heating (at the portion where the sheet contacted with the mandrel) as shown in Table 1. The cylindrical intermediate obtained had insufficient adhesion between superposed prepreg layers, was bulky, and also had fiber disorder. This cylindrical intermediate was subjected to molding in the same manner as in Example 2. As a result, as shown in Table 1, the pipe obtained had a poor appearance with fiber disorder and contained voids as in Comparative Example 1. This is because of insufficient elimination of vacant spaces formed between superposed prepreg layers in production of the cylindrical intermediate.

COMPARATIVE EXAMPLE 3

A. The same unidirectional Besfight/PC prepreg sheet as in Example 2 was used to attempt preparation of a cylindrical intermediate for production of a fiber-reinforced thermoplastic resin pipe using the apparatus shown in FIG. 9. The apparatus used was the same as that shown in FIGS. 1-*a* and 1-*b*, except that this apparatus did not have a guide sheet 122. As a result, mandrel 113 only rolled on prepreg sheet 123, and a cylindrical intermediate for a fiber-reinforced thermoplastic resin pipe was not produced with this apparatus. The winding conditions that were used are shown in Table 1.

Figure 10:
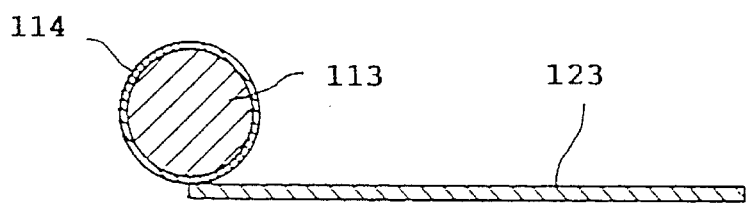
FIG. 10 is a side view illustrating the process of Comparative Example 3-B for producing a cylindrocal intermediate.

B. The same unidirectional Besfight/PC prepreg sheet as in Example 2 was used to attempt preparation of a cylindrical intermediate for a fiber-reinforced thermoplastic resin pipe using the same apparatus as in A, except that mandrel 113 had a coating of a 50 μm-thick film 114 of polycarbonate (the same as used in the prepreg) as shown in FIG. 10 for the purpose of adhering the front end part of the prepreg sheet to the mandrel. The winding conditions that were used are shown in Table 1. As a result, the adhesion between prepreg sheet 123 and mandrel 113 was improved and the front end part of the prepreg sheet 123 satisfactorily adhered to the mandrel 113. However, the wound part of the prepreg sheet 123 peeled off mandrel 113 prior to coming into contact with the cooled plate, because the softened prepreg sheet could not remain attached to the mandrel. Thus, the prepreg could not be wound.

Figure 11:
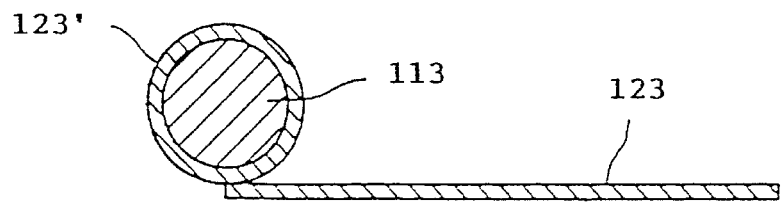
FIG. 11 is a side view illustrating the process of Comparative Example 3-C for producing a cylindrical intermediate.

C. The same unidirectional Besfight/PC prepreg sheet as in Example 2 was used as follows. A part of this prepreg sheet was wound beforehand on the mandrel 113 by a hand lay-up method with partial heating (at the portion where the prepreg sheet contacted the mandrel) to form a first layer 123' as shown in FIG. 11. The remainder of the prepreg was then used to attempt preparation of a cylindrical intermediate for a fiber-reinforced thermoplastic resin pipe using the same apparatus as in A above. As a result, a cylindrical intermediate could be obtained with this apparatus, but the production efficiency was low because the hand lay-up operation was included in the process. In addition, prepreg 123 could not be intimately wound on the mandrel which adversely affected the shape of the resulting cylindrical intermediate. Hence, the cylindrical intermediate thus obtained was unsatisfactory.

EXAMPLE 3

The same unidirectional Besfight/PC prepreg sheet as in Example 1 was used as a prepreg sheet. The prepreg sheet was cut and superposed so as to be wound at fiber orientations of 0° (at the first layer) and 90° (at the second layer) with respect to the axis direction of the mandrel. Each prepreg sheet had dimensions of 150 mm in the direction of the axis and 55 mm in the direction of winding so as to obtain a pipe having a wall thickness of about 0.3 mm. This prepreg sheet was wound on a mandrel having an outer diameter of 15 mm. The winding method and conditions that were used are shown in Table 1.

The cylindrical intermediate obtained under the conditions shown in Table 1 had a satisfactory appearance with no fiber disorder, and had a uniform wall thickness except for the part corresponding to the rear edge part of the prepreg sheet. This cylindrical intermediate was subjected to molding in the same manner as in Example 1. As a result, a fiber-reinforced thermoplastic resin pipe was obtained which, as shown in Table 1, had a satisfactory appearance with no fiber disorder and was free from internal voids.

COMPARATIVE EXAMPLE 4

The same unidirectional Besfight/PC prepreg sheet as in Example 3 was used to produce a cylindrical intermediate for a fiber-reinforced thermoplastic resin pipe by a hand lay-up method with partial heating as shown in Table 1. The cylindrical intermediate thus obtained had insufficient adhesion between the superposed prepreg layers, was bulky, and also had fiber disorder. This cylindrical intermediate was subjected to molding in the same manner as in Example 1. As a result, as shown in Table 1, the resulting pipe had a poor appearance with fiber disorder and contained voids. This is because of the insufficient elimination of the vacant spaces formed between superposed prepreg layers in production of the cylindrical intermediate.

Figure 12:
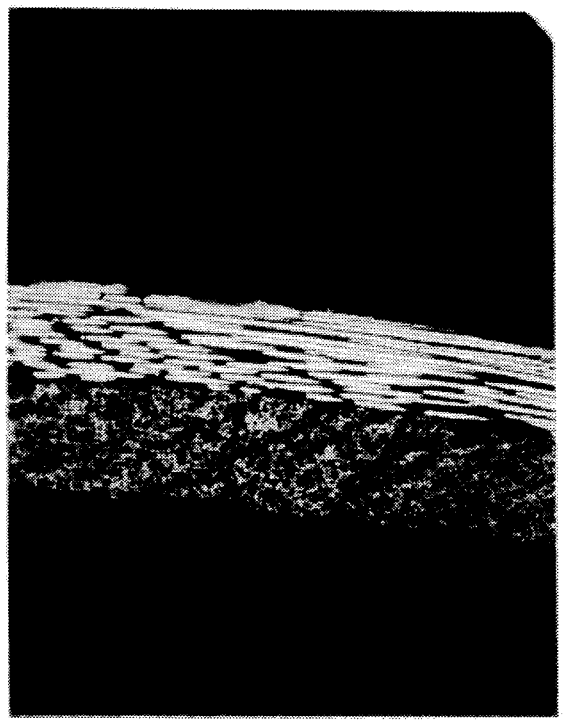
FIG. 12 is a photograph showing fibers in a part of a cross section of the pipe obtained in Example 3 of this invention.
Figure 13:
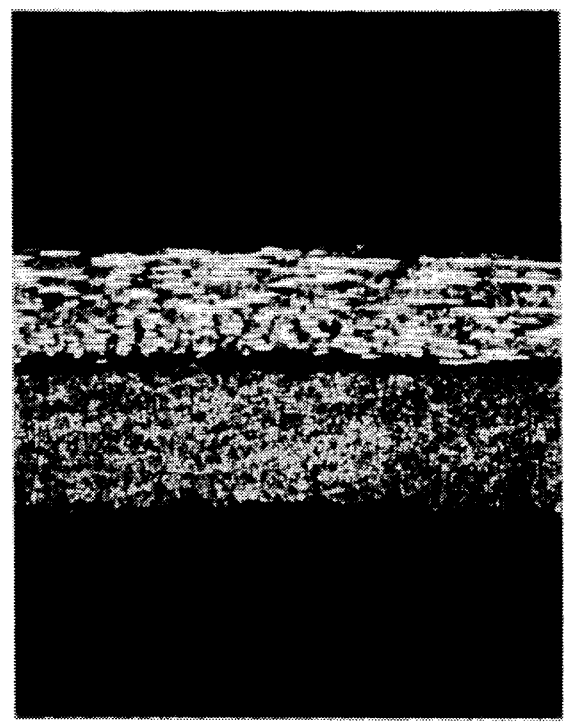
FIG. 13 is a photograph showing fibers in a part of a cross section of the pipe obtained in Comparative Example 4.

Photographs of a part of a cross section of each of the Besfight/PC pipe (the fiber direction of the outermost layer was 90° with respect to the mandrel axis) obtained in Example 3 and Comparative Example 4 are shown in FIGS. 12 and 13, respectively, for the purpose of comparison. These photographs show that the fiber-reinforced thermoplastic resin pipe molded from a cylindrical intermediate obtained by the process of the present invention was void-free between prepreg sheets, whereas the fiber-reinforced thermoplastic resin pipe molded from a cylindrical intermediate obtained by a hand lay-up method with partial heating contained voids between superposed prepreg layers.

EXAMPLE 4

Unidirectional Besfight/polyamide resin (PA 12) prepregs (manufactured by Toho Rayon Co., Ltd.) were used as a prepreg. Besfight was the same carbon fiber as used in Example 1, and the polyamide had

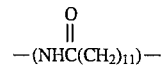

as polymerization units and had a glass transition temperature of about 50° C., a melting temperature of 175° to 179° C., and a heat distortion temperature of 42° C. (trade name: ORGASOL; manufactured by ATO CHEM Co., Ltd.) The weight of carbon fiber in the prepreg sheet was 155 g/m$^2$, and the prepreg had a RC of 35% and a thickness of 0.25 mm.

The prepreg sheet was cut and superposed as shown in FIG. 6 so as to be wound at fiber orientations of ±45° with respect to the axis direction of the mandrel as shown in Table 1. Three prepreg sheets thus obtained were used, which sheets each had dimensions of 500 mm in the direction of the axis and 600 mm in the direction of winding to obtain a pipe with a wall thickness of about 3 mm. The three sheets were wound on a mandrel with an outer diameter of 30 mm one after another in three separate operations.

Thus, a cylindrical intermediate for use in molding a fiber-reinforced thermoplastic resin pipe was obtained under the conditions shown in Table 1. This cylindrical intermediate had a satisfactory appearance with no fiber disorder and had a uniform thickness except for the part corresponding to the rear edge part of the finally wound sheet. This cylindrical intermediate was subjected to molding in the same manner as in Example 1. As a result, a fiber-reinforced thermoplastic resin pipe was obtained which, as shown in Table 1, had a satisfactory appearance with no fiber disorder and was free from internal voids.

COMPARATIVE EXAMPLE 5

The same unidirectional Besfight/PA 12 prepregs as in Example 4 were used to prepare a cylindrical intermediate for a fiber-reinforced thermoplastic resin pipe by a hand lay-up method with partial heating as shown in Table 1. The cylindrical intermediate thus obtained had insufficient adhesion between superposed prepreg layers, was bulky, and also had fiber disorder.

This cylindrical intermediate tended to fray, and particularly at the ends thereof. It was therefore necessary to repair such a part by, e.g., bonding with a soldering iron or the like. Moreover, since three prepreg sheets had been wound one after another, the cylindrical intermediate was bulkier at the ends than the cylindrical intermediate obtained in Comparative Example 1. This cylindrical intermediate was subjected to molding in the same manner as in Example 1. As a result, as shown in Table 1, the pipe thus obtained had a poor appearance with fiber disorder. The pipe also contained voids because of insufficient elimination of vacant spaces formed between superposed prepreg layers in production of the cylindrical intermediate.

EXAMPLE 5

A prepreg having a RC of 40% by weight and obtained by impregnating carbon fiber fabric (mean diameter of filaments: 7 μm; plain weave of 3000-filament strands; fabric W3101 manufactured by Toho Rayon Co., Ltd.) with the same polycarbonate matrix resin as in Example 1 was used as a prepreg sheet.

The prepreg sheet was cut and superposed so as to be wound at a fiber orientation (of the warp) of 0° with respect to the axis direction of the mandrel as shown in Table 1. The prepreg sheet had dimensions of 150 mm in the direction of the axis of the mandrel and 55 mm in the direction of winding so as to obtain a pipe having a wall thickness of about 0.3 mm. This resin-impregnated reinforcement was wound on a mandrel having a diameter of 15 mm using the winding method and conditions shown in Table 1. A stainless-steel film having a thickness of 25 μm was used as a guide sheet.

Thus, a cylindrical intermediate for use in molding a fiber-reinforced thermoplastic resin pipe was obtained under the conditions shown in Table 1. This cylindrical intermediate had a satisfactory appearance with no fiber disorder and had a uniform thickness except for the part corresponding to the rear edge part of the prepreg sheet. This cylindrical intermediate was subjected to molding in the same manner as in Example 1. As a result, a fiber-reinforced thermoplastic pipe was obtained which, as shown in Table 1, had a satisfactory appearance with no fiber disorder and was free from internal voids.

COMPARATIVE EXAMPLE 6

The same W3101/PC prepreg sheet as in Example 5 was used to produce a cylindrical intermediate for a fiber-reinforced thermoplastic resin pipe by a hand lay-up method with partial heating as shown in Table 1. The cylindrical intermediate obtained was not cylindrical (i.e., the intermediate did not have a circle section) and had fiber disorder. This cylindrical intermediate was subjected to molding in the same manner as in Example 1. As a result, as shown in Table 1, the pipe thus obtained had a poor appearance with fiber disorder, and contained internal voids in the part corresponding to the rear edge part of the prepreg sheet.

EXAMPLE 6

Unidirectional Besfight/polycarbonate prepregs (the same as used in Example 1) were used as prepreg sheet 241 to produce a pipe using the apparatus shown in FIG. 2. The carbon fiber weight in the prepreg sheet was 155 g/m², and the prepreg sheet has a resin content (RC) of 38% and a thickness of 0.25 mm. The prepreg sheet 241 had a trapezoidal shape as shown in FIG. 7-b and the trapezoid had an upper side length (a) of 31 mm, a lower side length (c) of 55 mm, and a height (b) of 700 mm. The fiber orientation in one of the prepregs was +45° and that in the other was −45° with respect to the axis direction of the mandrel.

Tapered mandrel 231 was an evenly tapered steel mandrel having a thinnest-part diameter of 4.5 mm, a thickest-part diameter of 12.5 mm, and a length of 1,000 mm. The guide sheet 232 was made of TEFLON sheet (TEFLON is a trade name: the sheet is manufactured by Enshu Rubber Co., Ltd.) made by coating a glass cloth with a tetrafluoroethylene resin.

The superposed prepreg sheets were offset from one another by 2.25 mm (d) and bonded together as shown in FIG. 7-b, and the resulting prepreg sheet 241 was placed on guide sheet 232 disposed on the lower plate 212 as shown in FIGS. 2 and 3. The prepreg sheet 241 was placed on the guide sheet 232 so that the end portion where the prepreg sheet was not superposed (in FIG. 14, the line to the right) was wound first. The upper plate 211 was then lowered and simultaneously therewith swung on the pin 216 so as to incline to conform with the taper of the tapered mandrel 213 and to press the prepreg sheet onto the entire length of mandrel 213.

The lower plate 212 and base 226 were simultaneously moved along rails 228 and 225, while a linear pressure of 4 kg/cm was continuously applied to mandrel 231. As a result, the guide sheet 232 followed the lower plate 212 and rolled tapered mandrel 231, while maintaining intimate contact with the external surface of tapered mandrel 231. The prepreg sheet 241 placed on the guide sheet 232 was heated at about 210° C. with heater 223 to impart thereto draping property and tackiness. The heated prepreg sheet 241 was sandwiched between tapered mandrel 231 and guide sheet 232, and intimately wound on the external surface of tapered mandrel 231.

During this winding, that part of prepreg sheet 241 located above tapered mandrel 231 came into contact with upper plate 211 which had been forcibly cooled to about 15° C. with the cooling water circulated through cooling pipe 219. As a result, prepreg sheet 241 was solidified while being wound on tapered mandrel 231, to thereby provide a tapered pipe intermediate. The intermediate thus obtained had a satisfactory appearance with almost no disorder of fibers.

Figure 14:
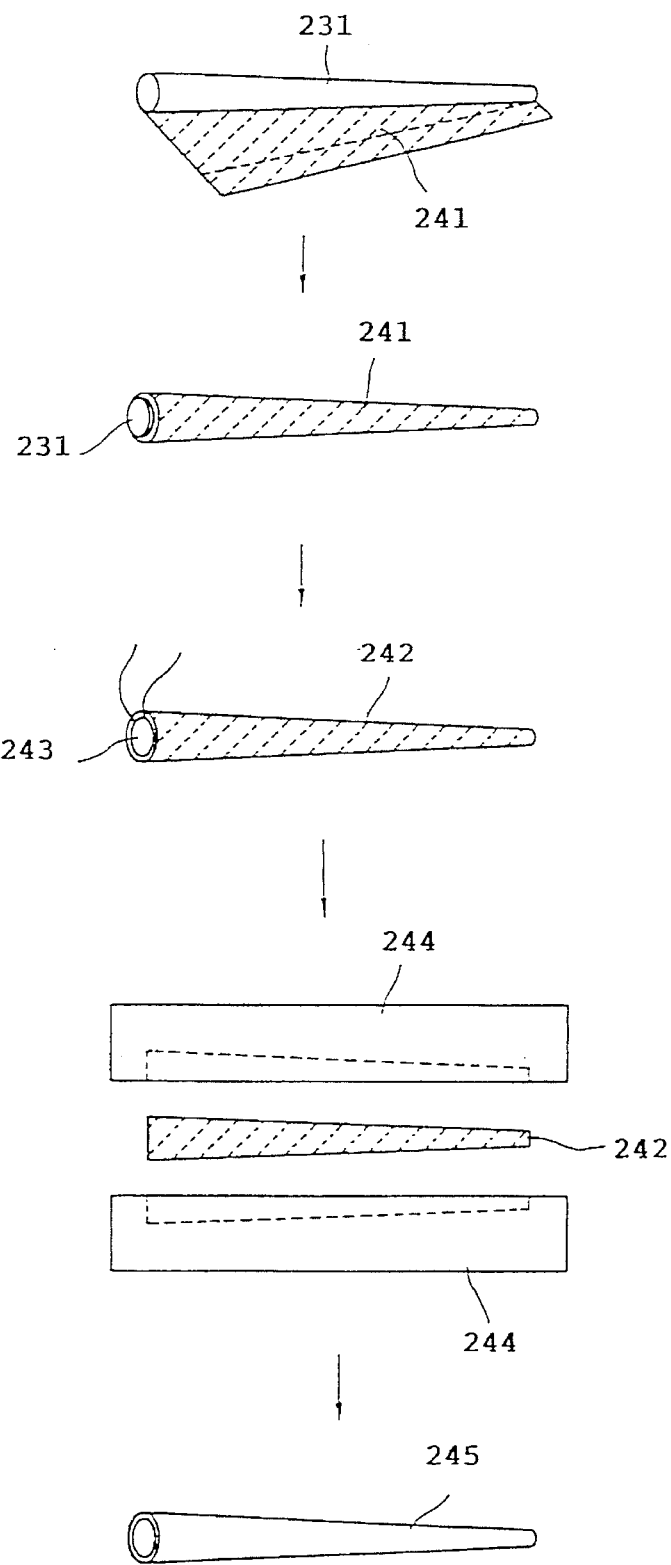
FIG. 14 illustrates the process of Example 6 for producing a tapered pipe of this invention.

The tapered mandrel 231 was then removed from the thus-obtained intermediate 242. A tapered object 243 made of polytetrafluoroethylene (PTFE) was then inserted into the hollow of this intermediate 242 as shown in FIG. 14. This structure was placed in mold 244 and heated to 320° C. in a $N_2$ atmosphere to expand the PTFE. Thus, molding was conducted by internal-pressure molding to obtain tapered pipe 245 made of a fiber-reinforced thermoplastic resin.

COMPARATIVE EXAMPLE 7

The same superposed trapezoidal prepreg sheet and the apparatus of Example 6 were used for production of a tapered pipe.

The tapered mandrel 231 was heated to 300° C. A 60-mesh powder of a polycarbonate (the same as used in Example 1) having an average molecular weight of 25,000 (melting point, 240° C.) was then adhered to the surface of heated mandrel 231 in an amount of from 4 to 7 g/m². This mandrel was reheated in an oven at 300° C. for 15 minutes to melt the polycarbonate powder.

Subsequently, an attempt was made to manually wind the superposed prepreg sheets on the resulting mandrel using a rolling table. However, the prepreg sheets returned to their original shape after being partly adhered to the mandrel. This is because the prepreg sheets were too rigid, and the polycarbonate adhering to the mandrel surface was softened by heating. Thus, the prepreg sheets could not be wound. This result shows that for winding prepreg sheets using the above method, prepreg sheets must be initially molded and bent into a shape corresponding to the contour of the mandrel.

TABLE 1

| | Example 1 | Comparative 1 | Example 2 | Comparative 2 | Comparative 3-A,B and C | Example 3 | Comparative 4 | Example 4 | Comparative 5 | Example 5 | Comparative 6 |
|---|---|---|---|---|---|---|---|---|---|---|---|
| Carbon Fiber configuration in reinforcement | unidirectional | unidirectional | unidirectional | unidirectional | unidirectional | unidirectional | unidirectional | unidirectional | unidirectional | fabric | fabric |
| Matrix resin | PC | PC | PC | PC | PC | PC | PC | PA12 | PA12 | PC | PC |
| Melting Pint (°C.) | 240 | 240 | 240 | 240 | 240 | 240 | 240 | 175–179 | 175–179 | 240 | 240 |
| Winding angle(°) | ±45 | ±45 | 90 | 90 | 90 | 0/90 | 0/90 | ±45 | ±45 | 0 | 0 |
| Winding method[1] | A | C | A | C | B | A | C | A | C | A | C |
| Heating temperature (°C.) | 210 | 300 | 210 | 300 | 210 | 210 | 300 | 160 | 300 | 210 | 300 |
| Cooling temperature (°C.) | 110 | — | 110 | — | 110 | 110 | — | 40 | — | 110 | — |
| Winding rate (m/min) | 10 | — | 10 | — | 10 | 10 | — | 10 | — | 10 | — |
| Load (kg/cm) | 6.3 | — | 6.3 | — | 6.3 | 6.3 | — | 6.3 | — | 6.3 | — |
| Results of winding | good | poor | good | poor | unable to be wound | good | poor | good | poor | good | poor |
| Results of molding: | | | | | | | | | | | |
| Appearance | good | fiber disorder | good | fiber disorder | — | good | fiber disorder | good | fiber disorder | good | fiber disorder |
| Internal structure | good | voids | good | voids | — | good[2] | voids[3] | good | voids | good | voids |

Figure 9:
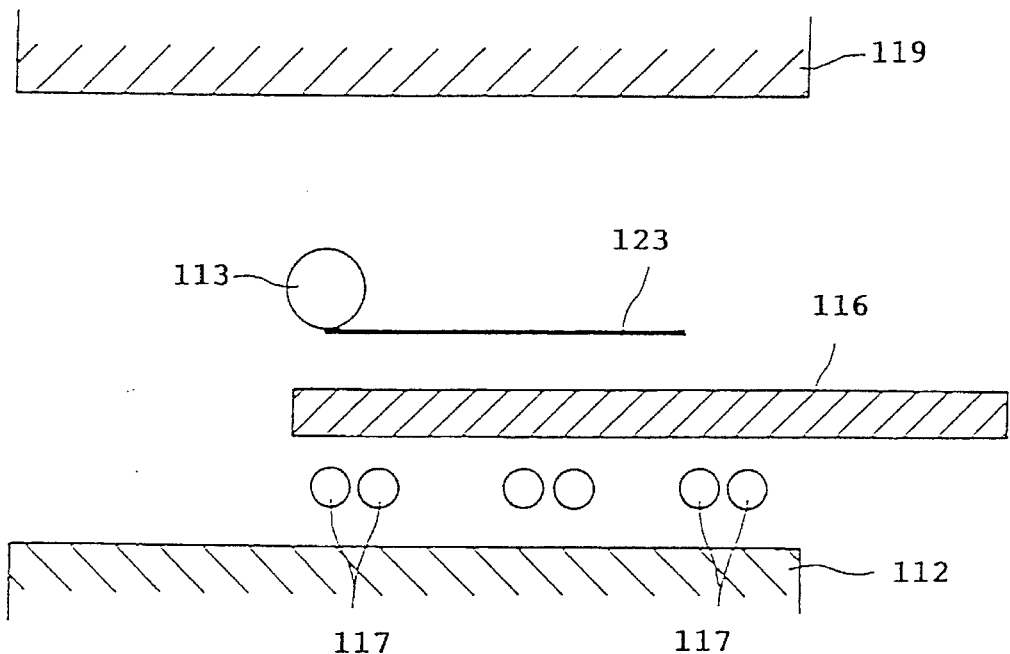
FIG. 9 is a side view of a comparative apparatus which does not employ a guide sheet.

Note
[1] A: method using the apparatus shown in FIGS. 1-a to 1-d, B: method shown by FIG. 9, C: hand lay-up method with partial heating.
[2] shown in the photograph of FIG. 10.
[3] shown in the photograph of FIG. 11.

EXAMPLE 7

A unidirectional Besfight/polyamide (PA12) prepreg sheet was used as a thermoplastic resin prepreg sheet. The weight of carbon fiber in the prepreg sheet was 164 g/m², and the prepreg sheet had a resin content (RC) of 33% and a thickness of 0.25 mm. Each of the prepreg sheets had a rectangular shape as shown in FIG. 7. The length in the winding direction was 140 mm, and the length in the mandrel axis direction was 700 mm. The fiber orientation in one of the prepregs was +45° and that in the other was −45° with respect to the direction of the axis. They were superposed with shifting by 11 mm as shown in FIG. 7-a.

The apparatus that was used is shown in FIGS. 4-a to 4c. This apparatus comprised an upper plate 311 and a lower plate 312, and had a guide sheet 332. The respective ends of the guide sheet were each fixed to one of the two plates, to thereby allow the guide sheet to be bent in the shape of the letter U. Mandrel 331 was disposed in the apparatus so as to be sandwiched between parts of the guide sheet 332 when the guide sheet was bent. The lower plate 312 was stationary, while the upper plate 311 was movable to the left relative to the lower plate 312 to thereby wind prepreg sheet 341 on mandrel 331.

Mandrel 331 that was used in this apparatus was a straight-shape steel mandrel which had an outer diameter of 14 mm and a length of 100 mm, and the surface thereof had been treated with a releasing agent.

The guide sheet 332 for use in winding prepreg sheet 341 on mandrel 331 was made of a sheet obtained by coating a glass cloth with a tetrafluoroethylene resin.

Prepreg sheet 341 obtained by superposing and bonding the prepreg sheets together as shown in FIG. 7 was placed on guide sheet 332 disposed on lower plate 312, as shown in FIG. 4-a. The upper plate 311 was lowered toward the stationary lower plate 312, and then moved in a direction vertical to the mandrel axis at a rate of 10 mm/min with application of a linear pressure of 3 kg/cm on mandrel 331. As a result, guide sheet 332 rolled mandrel 331 with movement of plate 311, while maintaining intimate contact with mandrel 331.

At this stage, prepreg sheet 341 had been heated to 250° C. on guide sheet 332 with the heating means of lower plate 312. The prepreg sheet 341 thus melted and softened exhibited draping properties. This prepreg sheet 341 disposed between mandrel 331 and guide sheet 332 was intimately wound on the external surface of mandrel 331.

When prepreg sheet 341 had been wound in this manner to make about a half round, the front part of prepreg sheet 341 which was located above mandrel 331 came into contact with upper plate 311 which had been cooled to 15° C. with cooling water circulated through cooling pipe 319. As a result, that front part of prepreg sheet 341 was quickly cooled to 150° C. and thus molded into a shape corresponding to the contour of mandrel 331.

After a subsequent half round, the front part of prepreg sheet 341 was heated with the heating means disposed in lower plate 312, and this front part came into intimate contact with a melted and softened part of the prepreg 341. As a result, the wound part of prepreg sheet 341 was fusion-bonded with the newly wound part of prepreg sheet 341.

After the mandrel 331 had thus made three turns while winding the thermoplastic resin prepreg sheet 341 thereon, prepreg sheet 341 with mandrel 331 was sent to a cooling zone 329 disposed in that part of lower plate 312 which had a cooling piping 330 for circulating cooling water therethrough and which had been cooled to 15° C. As a result, prepreg sheet 341 was forcibly cooled to 40° C. Thus, a fiber-reinforced thermoplastic resin pipe was obtained which had an inner diameter of 14 mm, a wall thickness of 1 mm, a length of 700 mm, and fiber content of 55% by volume. The time required for obtaining this fiber-reinforced thermoplastic resin pipe was about one minute as measured from the starting time of material setting.

The fiber-reinforced thermoplastic resin pipe thus obtained was free from fiber disorder and had a good appearance. A microscopic examination revealed that the pipe did not contain internal voids and was satisfactory. Furthermore, the pipe thus obtained had almost the same flexural strength (as measured in accordance with JIS K6911-1979) as a pipe obtained by an internal-pressure molding method in which polytetrafluoroethylene (PTFE) was heated and expanded.

COMPARATIVE EXAMPLE 8

The same unidirectional Besfight/polyamide 12 prepreg sheets (manufactured by Toho Rayon Co., Ltd.) as in Example 7, except that the weight of carbon fiber in the prepreg sheet was 164 g/m$^2$, and the resin content (RC) was 41%, were used as thermoplastic resin prepreg sheets.

Two of the prepreg sheets each having a rectangular shape were superposed as shown in FIG. 7-a. The length in the winding direction was 140 mm, and the length in the mandrel axis direction was 700 mm. The sheets were superposed as shown in FIG. 7-a. The fiber orientation in one of the prepregs was +45° and that in the other −45° with respect to the direction of the mandrel.

Using this prepreg sheet superposed and bonded in some spots, a cylindrical intermediate was prepared in the same manner as in Example 4, except that the linear pressure was 4 kg/cm, the heating temperature was 180° C. and winding of the prepreg sheet was conducted without forced cooling. The thus obtained intermediate was molded in the same manner as Example 1, except that the heating temperature was 300° C. The thus obtained pipe had an inner diameter of 14 mm, a wall thickness of 1 mm, and a length of 700 mm. This pipe had a fiber content of 55% by volume. The time required for obtaining this fiber-reinforced thermoplastic pipe was about 120 minutes.

EXAMPLE 8

Unidirectional Besfight/polycarbonate prepreg sheets (the same as used in Example 1) were used as thermoplastic resin prepreg sheets. The weight of carbon fiber in the prepreg sheet was 156 g/m$^2$, and the prepreg sheet had a resin content (RC) of 40% and a thickness of 0.25 mm.

Each of the prepreg sheets had a rectangular shape as shown in FIG. 6. The length in the winding direction was 140 mm, and the length in the mandrel axis direction was 700 mm. Prepreg sheets were superposed so that the fiber orientation in one of the prepregs was +45° and that in the other was −45° with respect to the direction of the axis upon winding. The prepreg sheets were shifted by 11 mm (d) as shown in FIG. 7-a.

A straight-shape steel mandrel 331 was used having an outer diameter of 14 mm and a length of 100 mm. The surface of the mandrel had been treated with a release agent. In combination with mandrel 331, guide sheet 332 made by coating a glass cloth with a tetrafluoroethylene resin was used in the apparatus shown in FIG. 4-a.

A thermoplastic resin prepreg sheet 341 obtained by bonding the superposed prepreg sheets together was placed on guide sheet 332 disposed on lower plate 312 having heating means 323, as shown in FIG. 4-a. The upper plate 311 was lowered toward the lower plate 312, and the upper plate 311 in the lowered state was moved in a direction vertical to the mandrel axis at a rate of 10 m/min with application of a linear pressure of 3 kg/cm to the mandrel. As a result, mandrel 331 rolled in accordance with the movement of plate 311, while guide sheet 332 was kept in intimate contact with mandrel 331. At this stage, prepreg sheet 341 had been heated to 260° C. on guide material 332 with heated plate 312. The thermoplastic resin prepreg 341 had thus been melted or softened, and had thereby acquired draping properties. This thermoplastic resin prepreg sheet 341, disposed between mandrel 331 and the guide sheet 332, was intimately wound on the external surface of mandrel 331.

When prepreg sheet 341 had thus been wound to make about a half round, the front part of prepreg sheet 341 which was located above mandrel 331 came into contact with upper plate 311 which had been cooled to 15° C. with cooling water circulated through cooling pipe 319. As a result, the front part of the prepreg sheet 341 was quickly cooled to 200° C. and thus molded into a shape corresponding to the contour of mandrel 331.

After a subsequent half round of winding, the front part of prepreg sheet 341 was reheated with lower plate 312, and the front part came into intimate contact with a melted and softened part of prepreg sheet 341 that was wound on the mandrel. As a result, these parts of the prepreg sheet 341 were fusion-bonded to each other. After mandrel 331 had made a predetermined number of turns, e.g., three turns, in such a manner while winding prepreg sheet 341 thereon, prepreg sheet 341 with mandrel 331 was sent to cooling zone 329 having cooling means 330 disposed in lower plate 312 and cooled to 15° C. As a result, the prepreg sheet 341 was forcibly cooled to 90° C.

Thus, a fiber-reinforced thermoplastic resin pipe was obtained which had an inner diameter of 14 mm, a wall thickness of 1 mm, a length of 700 mm, and a fiber content of 50% by volume. The time required for obtaining this fiber-reinforced thermoplastic pipe was about one minute as measured from the time of material setting.

The fiber-reinforced thermoplastic resin pipe thus obtained was free from fiber disorder and had a good appearance. A microscopic examination revealed that the pipe did not contain internal voids and was satisfactory. Furthermore, the pipe obtained was found to have almost the same bending strength (as measured in accordance with JIS K6911-1979) as a pipe obtained by an internal-pressure molding method in which polytetrafluoroethylene (PTFE) was heated and expanded.

COMPARATIVE EXAMPLE 9

Unidirectional Besfight/polycarbonate prepreg sheets (manufactured by Toho Rayon Co., Ltd.) were used as a thermoplastic resin prepreg. The carbon fiber and the polycarbonate of the prepreg sheet were the same as in the prepreg sheet used in Example 1. The weight of carbon fiber in the prepreg sheet was 156 g/m$^2$, and the prepregs had a resin content (RC) of 45% and a thickness of 0.25 mm.

A cylindrical intermediate was obtained in the same manner as in Example 7, except that the heating temperature was 220° C. Next, a pipe was obtained in the same manner as in Example 1. Thus, a fiber-reinforced thermoplastic resin pipe having an inner diameter of 14 mm, a wall thickness of 1 mm, a length of 700 mm, and a fiber content of 50% by volume was obtained. The time required for obtaining this pipe was about 120 minutes.

EXAMPLE 9

Unidirectional Besfight/polycarbonate prepreg sheets (manufactured by Toho Rayon Co., Ltd.) were used as a thermoplastic resin prepreg. The carbon fiber and polycarbonate contained in the prepreg sheets were the same as in the prepreg sheet of Example 1. The weight of carbon fiber in the prepreg sheet was 156 g/m$^2$, and the prepreg sheet had a resin content (RC) of 41% and a thickness of 0.25 mm.

The prepreg sheets 41 each had a trapezoidal shape as shown in FIG. 7-b, and the trapezoid had an upper side length (a) of 62 mm, a lower side length (c) of 110 mm, and a height (b) of 700 mm. Two prepreg sheets were superposed and adhered in some spots to prevent the sheets from slipping past each other. The fiber orientation in one of the prepreg sheet was +45° and that in the other was −45° with respect to the direction of the mandrel axis upon winding on the mandrel.

The apparatus shown in FIG. 5 was used for producing a tapered pipe. This apparatus was the same as the apparatus shown in FIGS. 2 and 3 except, that the lower plate 212 had, in the direction of movement of the mandrel, a cooling zone 229 having a cooling pipe 230 which was positioned so that after completion of winding the mandrel could be continuously moved to this zone. Cooling zone 229 constituted a second cooling means.

Thermoplastic resin prepreg 341 obtained by bonding the prepreg sheets together as shown in FIG. 7 was placed on guide sheet 232 disposed on lower plate 212 on heating zone 231 in the apparatus shown in FIG. 5. Upper rolling plate 211 was then lowered and swung on pin 216 so as to incline in conformance with the taper of mandrel 231 and to evenly apply the same pressure to the external surface of mandrel 231 over the entire length of the mandrel 231. A linear pressure of 3 kg/cm was thus applied.

Lower plate 212 was moved together with base 226 in the direction of the X axis, i.g., in the direction of the width of plate 212, along guide rails 228, while linear pressure was continuously applied. During this movement, lower plate 212 was slightly moved in the direction of the Y axis relative to base 226 by means of guide rails 225. As a result, the fan-shaped locus corresponding to the developed external surface of mandrel 231 was attained, and mandrel 231 was smoothly rolled while maintaining intimate contact with guide sheet 232.

At this stage, thermoplastic resin prepreg sheet 241 placed on guide sheet 232 was heated to 260° C. with heating means 231 disposed within lower plate 212. Thermoplastic resin prepreg sheet 241, which had been melted and softened to acquire draping properties, was clamped between mandrel 231 and guide sheet 232, and intimately wound on the external surface of mandrel 231.

The part of prepreg sheet 241 which was located above mandrel 231 came into contact with upper plate 211 which had been forcibly cooled to 15° C. with cooling water circulated through cooling pipe 219. As a result, the part of thermoplastic resin prepreg sheet 241 which had made a half round of winding on mandrel 231 was solidified.

After mandrel 231 had thus made three turns while winding prepreg sheet 241 thereon, prepreg 241 with mandrel 231 was sent to cooling zone 229 disposed in lower plate 212, which zone had been cooled to 15° C. with cooling water circulated through the circulating pipe 230. The wound prepreg was thus forcibly cooled.

As a result, a tapered pipe was obtained which had a thinnest-part inner diameter of 4.5 mm, a thickest-part inner diameter of 12.5 mm, a wall thickness of 1 mm, a length of 700 mm, and fiber content of 50% by volume.

The time required for obtaining this tapered pipe was about one minute as measured from the starting time of material setting. The taper pipe thus obtained was free from fiber disorder and had a good appearance. A microscopic examination revealed that the pipe thus obtained had no internal voids inside and was satisfactory.

While the invention has been described in detail and with reference to specific embodiments thereof, it will be apparent to one skilled in the art that various changes and modifications can be made therein without departing from the spirit and scope thereof.

What is claimed is:

1. A process for producing a cylindrical product of a fiber reinforcement-thermoplastic resin composite, which comprises:

disposing a mandrel on a flexible guide sheet, heating a fiber reinforcement-thermoplastic resin composite sheet to a temperature not lower than the distortion temperature of the resin and lower than the thermal degradation temperature of the resin of the composite, disposing an end of the heated composite sheet at a line of contact of the mandrel with the flexible guide sheet, then rolling the mandrel on the guide sheet while moving the guide sheet, said guide sheet forming a shape of the letter U around the mandrel being drawn into the concave portion of the letter U, and the composite sheet disposed between the mandrel and the guide sheet being in intimate contact with the mandrel and the guide sheet, to thereby wind the composite sheet on the mandrel, and then recovering a cylindrical product made from the wound composite sheet.

2. The process for producing a cylindrical product as in claim 1, wherein the composite sheet is heated to a temperature not higher than fluidizing temperature or the melting temperature of the thermoplastic resin to thereby obtain an intermediate product for molding fiber reinforced thermoplastic resin pipe.

3. The process for producing a cylindrical product as in claim 2, wherein the thermoplastic resin is an amorphous polymer and the heating temperature is not lower than the fluidizing temperature of the thermoplastic resin by 5° to 80° C.

4. The process for producing a cylindrical product as in claim 2, wherein the thermoplastic resin is a crystalline polymer and the heating temperature is not lower than the melting temperature of the thermoplastic resin by 5° to 80° C.

5. The process for producing a cylindrical product as in claim 1, wherein the composite sheet is heated to a temperature not lower than the fluidizing temperature or the melting temperature of the thermoplastic resin and the composite sheet wound on the mandrel is cooled to a temperature lower than the fluidizing temperature or the melting temperature of the thermoplastic resin to thereby directly obtain a fiber reinforced thermoplastic resin pipe.

6. The process for producting a cylindrical product as in claim 5, wherein the thermoplastic resin is an amorphous polymer and the heating temperature is higher than the fluidizing temperature of the thermoplastic resin by 5° to 50° C.

7. The process for producting a cylindrical product as in claim 5, wherein the thermoplastic resin is a crystalline polymer and the heating temperature is higher than the melting temperature of the thermoplastic resin by 5° to 80° C.

8. The process for producing a cylindrical product as in claim 1, further comprising forcibly cooling the composite sheet after being wound on the mandrel to a temperature lower than the distortion temperature of the resin.

9. The process for producing a cylindrical product as in claim 2, which further comprises heating and pressing the intermediate product to mold a pipe therefrom prior to or after recovering the intermediate product from the mandrel.

10. The process for producing a cylindrical product as in claim 9, wherein said further heating and pressing comprises internal-pressure molding or external-pressure molding of the cylindrical intermediate to thereby obtain a fiber reinforced thermoplastic resin pipe.

11. The process for producing a cylindrical product as in claim 1, wherein said rolling comprises pressing the composite sheet through the medium of the guide sheet in the direction of the mandrel axis.

12. The process for producing a cylindrical product as in claim 1, wherein the composite sheet wound on the mandrel is applied at a pressure of 0.05 to 10 kg/cm through the guide sheet at the contact line of the mandrel and the guide sheet.

13. The process for producing a cylindrical product as in claim 1, wherein said fiber reinforcement is selected from the group consisting of carbon fiber, aromatic polyamide fiber, silicon carbide fiber, boron fiber, and alumina fiber.

14. The process for producing a cylindrical product as in claim 1, wherein said thermoplastic resin is selected from the group consisting of a polysulfone, a polyethersulfone, a polyetherketone, a polyetheretherketone, an aromatic polyamide, an aromatic polyester, an aromatic polycarbonate, a polyetherimide, a poly(arylene oxide), a thermoplastic polyimide, a poly(amide-imide), a poly(phenylene sulfide), a polyethylene and polypropylene.

15. The process for producing a cylindrical product as in claim 1, wherein the composite sheet contains at least one fiber reinforcement in an amount of 20 to 70% based on the volume of the composite sheet.

16. The process for producing a cylindrical product as in claim 1, wherein the composite sheet has a thickness of not more than 5 mm.

17. The process for producing a cylindrical product as in claim 1, wherein the mandrel has a sectional shape of a circle of the same size at both ends of the mandrel.

18. The process for producing a cylindrical product as in claim 1, wherein the mandrel is a tapered mandrel.

19. The process for producing a cylindrical product as in claim 1, wherein the guide sheet comprises a material selected from the group consisting of a heat-resistant glass cloth, polyimide and stainless-steel.

20. The process for producing a cylindrical product as in claim 1, wherein the guide sheet has a thicknes of from 15 to 100 μm.

* * * * *